(12) United States Patent
Yu et al.

(10) Patent No.: US 12,475,388 B2
(45) Date of Patent: Nov. 18, 2025

(54) MACHINE LEARNING MODEL SEARCH METHOD, RELATED APPARATUS, AND DEVICE

(71) Applicant: Huawei Technologies Co., Ltd., Guangdong (CN)

(72) Inventors: Qinghua Yu, Shanghai (CN); Mohan Liu, Shenzhen (CN); Zhicheng Sui, Shenzhen (CN); Li Zhou, Shenzhen (CN); Lixun Bai, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 760 days.

(21) Appl. No.: 17/758,166

(22) PCT Filed: Nov. 19, 2020

(86) PCT No.: PCT/CN2020/130043
§ 371 (c)(1),
(2) Date: Jun. 29, 2022

(87) PCT Pub. No.: WO2021/135707
PCT Pub. Date: Jul. 8, 2021

(65) Prior Publication Data
US 2023/0042397 A1  Feb. 9, 2023

(30) Foreign Application Priority Data

Dec. 31, 2019  (CN) .......................... 201911419960.0

(51) Int. Cl.
*G06N 5/04*  (2023.01)
*G06N 3/04*  (2023.01)
(Continued)

(52) U.S. Cl.
CPC ................ *G06N 5/04* (2013.01); *G06N 3/04* (2013.01); *G06N 3/063* (2013.01); *G06N 3/08* (2013.01)

(58) Field of Classification Search
CPC ........... G06N 5/04; G06N 3/04; G06N 3/063; G06N 3/08; G06N 3/0464; G06N 3/0495; G06N 3/09; G06N 20/00; Y02D 10/00
See application file for complete search history.

(56) References Cited

U.S. PATENT DOCUMENTS

2019/0347550 A1   11/2019  Jung et al.

FOREIGN PATENT DOCUMENTS

| CN | 108734266 A | * | 11/2018 | ............. G06N 3/045 |
| CN | 109190754 A | * | 1/2019 | ............. G06N 3/045 |

(Continued)

OTHER PUBLICATIONS

Zhuang, "Towards Effective Low-bitwidth Convolutional Neural Networks", 2017 (Year: 2017).*
Jacob, "Quantization and Training of Neural Networks for Efficient Integer-Arithmetic-Only Inference", 2017 (Year: 2017).*
Wang, "HAQ: Hardware-Aware Automated Quantization with Mixed Precision", 2019 (Year: 2019).*

(Continued)

*Primary Examiner* — Andrew J Jung
*Assistant Examiner* — Alvaro S Laham Bauzo
(74) *Attorney, Agent, or Firm* — WOMBLE BOND DICKINSON (US) LLP

(57) ABSTRACT

This application relates to the field of artificial intelligence technologies, and discloses a machine learning model search method, a related apparatus, and a device. In the method, before model search and quantization, a plurality of single bit models are generated based on a to-be-quantized model, and evaluation parameters of layer structures in the plurality of single bit models are obtained. Further, after a candidate model selected from a candidate set is trained and tested, to obtain a target model, a quantization weight of each layer structure in the target model may be determined based on a (Continued)

network structure of the target model and evaluation parameters of all layer structures in the target model, a layer structure with a maximum quantization weight in the target model is quantized, and a model obtained through quantization is added to the candidate set.

16 Claims, 9 Drawing Sheets

(51) Int. Cl.
*G06N 3/063* (2023.01)
*G06N 3/08* (2023.01)

(56) References Cited

FOREIGN PATENT DOCUMENTS

| | | |
|---|---|---|
| CN | 110555508 A | 12/2019 |
| CN | 111178546 A | 5/2020 |

OTHER PUBLICATIONS

Tan, "MnasNet: Platform-Aware Neural Architecture Search for Mobile", 2019 (Year: 2019).*
Kuan Wang et al., "HAQ: Hardware-Aware Automated Quantization With Mixed Precision", Jun. 15-20, 2019, total: 10pages.
Raghuraman Krishnamoorthi: "Quantizing deep convolutional networks for efficient inference: A whitepaper", arxiv.org, Cornell University Library, 201 Olin Library Cornell University Ithaca, NY 14853. Jun. 21, 2018 (Jun. 21, 2018), XP080893243,total 36 pages.

* cited by examiner

MACHINE LEARNING MODEL SEARCH METHOD, RELATED APPARATUS, AND DEVICE

CROSS REFERENCE TO RELATED APPLICATIONS

This application is a national stage of International Application No. PCT/CN2020/130043, filed Nov. 19, 2020, which claims priority to Chinese Patent Application No. 201911419960.0, filed Dec. 31, 2019. Both of the aforementioned applications are hereby incorporated by reference in their entireties.

TECHNICAL FIELD

This application relates to the field of terminal technologies, and in particular, to a machine learning model search method, a related apparatus, and a device.

BACKGROUND

With rapid development of deep learning, a deep neural network is widely used in an image field, a speech field, a text classification field, a recognition field, and the like. A network structure of the deep neural network is usually complex, inference time is long, and a large quantity of memory needs to be occupied during running of the deep neural network. The deep neural network cannot be applied to the mobile terminal due to limitations of a computing capability of a processor in a mobile terminal and a storage resource of a memory in the mobile terminal. Therefore, how to deploy a deep learning model with an increasing computing amount on the mobile terminal is a difficult problem that needs to be urgently resolved currently.

Performing mixed bit quantization on the deep neural network is an efficient solution to this problem. Mixed bit quantization means that a model parameter originally stored by using a 32-bit floating point is stored by using fixed points with different low bits (including 1 bit, 2 bits, 4 bits, and the like), to reduce a memory size, inference time, power consumption, and the like that are required for running the deep neural network on the mobile terminal.

In the conventional technology, a method for accelerating a model by combining mixed bit quantization and neural architecture search (NAS) is proposed. A principle of the method is as follows: Operation S1: Predict, layer by layer by using a reinforcement learning decision maker, a quantization manner of each layer starting from the first layer of a to-be-quantized model (1 to 8 bits are used in an optional solution, but 2 to 8 bits are actually used). Operation S2: After determining a quantization scheme at a $k^{th}$ layer through prediction, the reinforcement learning decision maker calculates inference time (a ROM size or power consumption) of a current quantization model on hardware. If a requirement is not met, bit quantities at quantized layers are reduced layer by layer starting from the first layer (for example, if a 7-bit quantization scheme is used at the first layer, the bit quantity is reduced to 6 bits) until the requirement is met. Operation S3: Train the model obtained in operation S2 to obtain an accuracy-based reward function, put the reward function into the reinforcement learning decision maker in operation S1, and select a next-layer quantization scheme until the model is completely quantized, to obtain a final mixed bit quantization model.

However, in the foregoing quantization and search process of the to-be-quantized model, a device needs to continuously communicate with the mobile terminal in a training process to obtain current model performance, and performs quantization layer by layer. This increases time consumption in the model search, resulting in low model quantization and search efficiency.

SUMMARY

Embodiments of the present invention provide a machine learning model search method, a related apparatus, and a device, to resolve a problem of low efficiency in a model quantization and search process.

According to a first aspect, an embodiment of the present invention provides a machine learning model search method, including: A computing device generates M single bit models based on a to-be-quantized model; obtains N evaluation parameters of all layer structures in each of the M single bit models, where the N evaluation parameters of all the layer structures in each of the M single bit models are obtained through a measurement when a mobile terminal runs the M single bit models; and performs a model search for at least one time, to output a model whose N evaluation parameters and accuracy meet their respective requirements, where the model search process includes: training and testing, by using a first dataset, a candidate model selected from a candidate set, to obtain a target model and accuracy of the target model; and when at least one of N evaluation parameters of the target model does not meet a requirement and the accuracy of the target model is greater than a target threshold, obtaining N evaluation parameters of all layer structures in the target model based on the N evaluation parameters of all the layer structures in the M single bit models, determining a quantization weight of each layer structure in the target model based on a network structure of the target model and the N evaluation parameters of all the layer structures in the target model, quantizing a layer structure with a maximum quantization weight in the target model, and adding a model obtained through quantization to the candidate set. The single bit model and the to-be-quantized model are deep neural networks with a same network structure, and M is a positive integer greater than 1. The candidate set includes at least one candidate model, the candidate model is a mixed bit model having a same network structure as the to-be-quantized model, and the first dataset includes a plurality of samples used to train and test the candidate model in the candidate set.

It should be understood that the computing device may be a server, a cloud, a distributed computing system, or the like.

In the foregoing method, before model quantization and model search, the plurality of single bit models are generated based on the to-be-quantized model, and the evaluation parameters of all layer structures in the plurality of single bit models are obtained. Further, after the candidate model selected from the candidate set is trained and tested, to obtain the target model, the quantization weight of each layer structure in the target model may be determined based on the network structure of the target model and the evaluation parameters of all layer structures in the target model, the layer structure with the maximum quantization weight in the target model is quantized, and the model obtained through quantization is added to the candidate set. In this way, information exchange with the terminal can be less frequent, and efficiency of model search and model quantization can be improved.

With reference to the first aspect, in an embodiment, the N evaluation parameters include inference time and a parameter quantity, and an implementation in which the computing device determines a quantization weight of each layer structure in the target model based on a network structure of the target model and the N evaluation parameters of all the layer structures in the target model may be as follows:

if the inference time of the target model is greater than target inference time and the parameter quantity of the target model is not greater than a target parameter quantity, determining a quantization weight of a layer structure i in the target model based on inference time of the layer structure i in the target model and a weight of the layer structure i in the target model;

if the inference time of the target model is not greater than target inference time and the parameter quantity of the target model is greater than a target parameter quantity, determining a quantization weight of a layer structure i in the target model based on a parameter quantity of the layer structure i in the target model and a weight of the layer structure i in the target model; or if the inference time of the target model is greater than target inference time and the parameter quantity of the target model is greater than a target parameter quantity, determining a quantization weight of a layer structure i in the target model based on inference time of the layer structure i in the target model, a parameter quantity of the layer structure i in the target model, and a weight of the layer structure i in the target model.

It should be understood that i is an index of a layer structure in the target model, i is a positive integer, i is not greater than a total quantity of layers of layer structures in the target model, and the total quantity of layers of the layer structures in the target model is the same as a total quantity of layers of layer structures in a to-be-assessed model.

In the foregoing method, when the inference time of the target model does not meet the requirement but the parameter quantity of the target model meets the requirement, the inference time of the layer structure in the target model is mainly considered when the quantization weight of the layer structure in the target model is determined. When the inference time of the target model meets the requirement but the parameter quantity of the target model does not meet the requirement, the parameter quantity of the layer structure in the target model is mainly considered when the quantization weight of the layer structure in the target model is determined. When neither the inference time nor the inference time of the target model meets the requirement, both the inference time and the inference time of the layer structure in the target model are considered when the quantization weight of the layer structure in the target model is determined, so that quantization can be performed when both the inference time and the parameter quantity meet the requirement. In this way, search efficiency and quantization efficiency are further improved.

Optionally, the quantization weight $P_i$ of the layer structure i in the target model is as follows:

$$P_i = softmax\{O_i[\alpha L_i * f(T) + \beta R_i * f(M)]\}$$

$$f(x) = \begin{cases} x, & x > 1 \\ 0, & x \le 1 \end{cases}$$

Herein, $\alpha$ and $\beta$ are respectively weights of the inference time and the parameter quantity; $O_i$ is the weight of the layer structure i; $L_i$ is the inference time of the layer structure i or a ratio of the inference time of the layer structure i to the inference time of the target model; $R_i$ is the parameter quantity of the layer structure i or a ratio of the parameter quantity of the layer structure i to the parameter quantity of the target model; T is a ratio of the inference time of the target model to the target inference time; and M is a ratio of the parameter quantity of the target model to the target parameter quantity.

The inference time of the target model is a sum of inference time of all layer structures in the target model, and the parameter quantity of the target model is a sum of parameter quantities of all layer structures in the target model.

Optionally, the weight of the layer structure i is related to a location of the layer structure i in the target model. A layer structure closer to an input layer of the target model has a smaller weight, and a layer structure closer to an output layer of the target model has a larger weight.

In the foregoing method, when the quantization weight of the layer structure in the target model is determined, importance of the location of the layer structure in the model for the accuracy of the model is considered, to try to avoid performing lower-bit quantization on the layer structure closer to the input layer as much as possible, ensure the accuracy of the model, and improve search and quantization efficiency.

With reference to the first aspect, in another embodiment, before the candidate model selected from the candidate set is trained and tested by using the first dataset, a model may be further selected from the candidate set. A specific implementation of selecting a model from the candidate set may be as follows: The computing device trains and tests each candidate model in the candidate set by using a second dataset, to obtain test accuracy of each candidate model in the candidate set, where a quantity of samples in the second dataset is less than a quantity of samples in the first data set; and selects a candidate model from the candidate set based on the test accuracy of each candidate model and a weight of each candidate model.

Optionally, the weight of the candidate model is determined based on a total quantity of times of model search performed when the candidate model is added to the candidate set and a total quantity of times of current model search.

Optionally, a probability/weight $Q_j$ of selecting a $j^{th}$ candidate model in the candidate set may be represented as follows:

$$Q_j = softmax(w_j A_j)$$

Herein, $A_j$ is test accuracy of the $j^{th}$ candidate model, and $w_j$ is a weight of the $j^{th}$ candidate model.

Another implementation of selecting a model from the candidate set may alternatively be as follows: The computing device directly selects a candidate model from the candidate set based on test accuracy of each candidate model, for example, selects a candidate model with highest test accuracy from the candidate set.

In the foregoing method, the model is selected based on the accuracy. This ensures that the selected model has optimal accuracy, and further improves accuracy of the final output target model.

With reference to the first aspect, in another embodiment, an implementation in which the computing device quantizes a layer structure with a maximum quantization weight in the target model may be as follows: The computing device converts a model parameter of the layer structure with the maximum quantization weight in the target model into a model parameter represented by at least one bit quantity, where the at least one bit quantity is a bit quantity that is in a bit quantity set and that is less than a current bit quantity of the model parameter of the layer structure with the maximum quantization weight in the target model, the bit quantity set includes M values, and the M values are used to indicate bit quantities of model parameters of the M single bit models.

In the foregoing method, lower-bit quantization is performed on the selected layer structure in the target model, and a quantized model is used as the candidate model.

With reference to the first aspect, in another embodiment, the model search process may further include: When the accuracy of the target model is less than the target threshold, the computing device reselects a model from the candidate set, and performs the model search.

In the foregoing method, when the accuracy of the target model does not meet the requirement, the target model is directly removed, to reduce search space and improve search efficiency.

With reference to the first aspect, in another embodiment, the N evaluation parameters include the inference time, and an implementation in which the computing device obtains N evaluation parameters of all layer structures in the M single bit models may be as follows: The computing device sends the M single bit models to the mobile terminal, so that the mobile terminal runs the M single bit models and measures inference time of each layer structure in the M single bit models; and receives the inference time that is of each layer structure in the M single bit models and that is sent by the mobile terminal.

In the foregoing method, inference time of any mixed bit model can be calculated after information is exchanged for only one time between the computing device and the mobile terminal. This improves search and quantization efficiency.

Optionally, the mobile terminal may alternatively measure a parameter quantity of each layer structure in the M single bit models; and the computing device may alternatively receive the parameter quantity that is of each layer structure in the M single bit models and that is sent by the mobile terminal.

With reference to the first aspect, in another embodiment, during model search performed for the first time, the candidate set includes a single bit model with a largest bit quantity in the M single bit models, so that the search starts from the single bit model with a highest bit.

According to a second aspect, an embodiment of this application further provides an image recognition method, including: A terminal obtains a to-be-recognized image, enters the to-be-recognized image into a second image recognition model to obtain a category of the to-be-recognized image, and outputs the category of the to-be-recognized image.

The second image recognition model is a target model that is output by using a first image classification model as a to-be-quantized model according to the machine learning model search method according to any one of the first aspect or the implementations of the first aspect. A first image recognition model is a trained deep neural network that can recognize a category of an image, and the first image recognition model is a full-floating-point model or a mixed model.

Optionally, the to-be-recognized image may be an image that is in a current scene and that may be obtained by a terminal through a camera.

The terminal may be a mobile phone, a tablet computer, a desktop computer, a digital camera, a smart watch, a smart band, a camera, a television, or the like. This is not limited herein.

In the foregoing method, a quantized model is run, so that a deep neural network can be run on a terminal with limited memory and processing resources.

According to a third aspect, an embodiment of this application further provides a machine learning model search apparatus, including:

a generation module, configured to generate M single bit models based on a to-be-quantized model, where the single bit model and the to-be-quantized model are deep neural networks with a same network structure, and M is a positive integer greater than 1;

a parameter obtaining module, configured to obtain N evaluation parameters of all layer structures in the M single bit models, where the N evaluation parameters of all the layer structures in the M single bit models are obtained through measurement when a mobile terminal runs the M single bit models; and an execution module, configured to perform model search for at least one time, to output a model whose N evaluation parameters and accuracy meet a requirement, where the execution module includes a training and test unit, an obtaining unit, a weight unit, a quantization unit, and an addition unit, and when the execution module performs the model search process, the training and test unit is configured to: train and test, by using a first dataset, a candidate model selected from a candidate set, to obtain a target model and accuracy of the target model, where the candidate set includes at least one candidate model, the candidate model is a mixed bit model having a same network structure as the to-be-quantized model, and the first dataset includes a plurality of samples used to train and test the candidate model in the candidate set;

the obtaining unit is configured to: when at least one of N evaluation parameters of the target model does not meet a requirement and the accuracy of the target model is greater than a target threshold, obtain N evaluation parameters of all layer structures in the target model based on the N evaluation parameters of all the layer structures in the M single bit models;

the weight unit is configured to determine a quantization weight of each layer structure in the target model based on a network structure of the target model and the N evaluation parameters of all the layer structures in the target model;

the quantization unit is configured to quantize a layer structure with a maximum quantization weight in the target model; and the addition unit is configured to add a model obtained through quantization to the candidate set.

Optionally, for specific implementations of each module/unit in the machine learning model search apparatus, refer to the related descriptions according to any one of the first aspect or the embodiments of the first aspect. The machine learning model search apparatus may further include another module/unit configured to implement the machine learning model search method according to any one of the first aspect or the embodiments of the first aspect. Details are not described herein again.

According to a fourth aspect, an embodiment of this application further provides a machine learning model search apparatus, including a processor and a memory. The memory is configured to store a program, the processor executes the program stored in the memory, and when the program stored in the memory is executed, the machine learning model search apparatus is enabled to implement the machine learning model search method according to any one of the first aspect or the embodiments of the first aspect.

Optionally, for specific implementations of each device/unit in the machine learning model search apparatus, refer to the related descriptions according to any one of the first aspect or the embodiments of the first aspect. The machine learning model search apparatus may further include another module/unit configured to implement the machine learning model search method according to any one of the first aspect or the embodiments of the first aspect. Details are not described herein again.

According to a fifth aspect, an embodiment of this application further provides an image recognition apparatus, including:

an obtaining unit, configured to obtain a to-be-recognized image;

a recognition unit, configured to enter the to-be-recognized image into a second image recognition model to obtain a category of the to-be-recognized image; and an output unit, configured to output the category of the to-be-recognized image.

The second image recognition model is a target model that is output by using a first image classification model as a to-be-quantized model according to the machine learning model search method according to any one of the first aspect or the implementations of the first aspect. A first image recognition model is a trained deep neural network that can recognize a category of an image, and the first image recognition model is a full-floating-point model or a mixed model.

Optionally, the to-be-recognized image may be an image that is in a current scene and that may be obtained by a terminal through a camera.

The image recognition apparatus may be a mobile phone, a tablet computer, a desktop computer, a digital camera, a smart watch, a smart band, a camera, a television, or the like. This is not limited herein.

According to a sixth aspect, an embodiment of this application further provides a machine learning model search apparatus, including a processor and a memory. The memory is configured to store a program, the processor executes the program stored in the memory, and when the program stored in the memory is executed, the machine learning model search apparatus is enabled to implement the image recognition method according to any one of the second aspect or the embodiments of the second aspect.

Optionally, for specific implementations of each device/unit in an image recognition apparatus, refer to the related descriptions according to any one of the second aspect or the embodiments of the second aspect. The image recognition apparatus may further include another module/unit configured to implement the image recognition method according to any one of the second aspect or the embodiments of the second aspect. Details are not described herein again.

According to a seventh aspect, an embodiment of this application further provides a computer readable storage medium. The computer readable medium is configured to store computer executable instructions, and when the computer executable instructions are invoked by the computer, the computer is enabled to implement the machine learning model search method according to any one of the first aspect or the embodiments of the first aspect.

According to an eighth aspect, an embodiment of this application further provides a computer program product including instructions. When the computer program product runs on an electronic device, the terminal is enabled to perform the machine learning model search method according to any one of the first aspect or the embodiments of the first aspect.

According to a ninth aspect, an embodiment of this application further provides a computer readable storage medium. The computer readable medium is configured to store computer executable instructions, and when the computer executable instructions are invoked by the computer, the computer is enabled to implement the image recognition method according to any one of the second aspect or the embodiments of the second aspect.

According to a tenth aspect, an embodiment of this application further provides a computer program product including instructions. When the computer program product runs on an electronic device, the terminal is enabled to perform the image recognition method according to any one of the second aspect or the embodiments of the second aspect.

BRIEF DESCRIPTION OF DRAWINGS

To describe the technical solutions in the embodiments of the present invention more clearly, the following briefly describes the accompanying drawings required for describing the embodiments. It is clear that the accompanying drawings in the following descriptions show merely some embodiments of the present invention, and a person of ordinary skill in the art may derive other drawings from these accompanying drawings without creative efforts.

DESCRIPTION OF EMBODIMENTS

Figure 1:
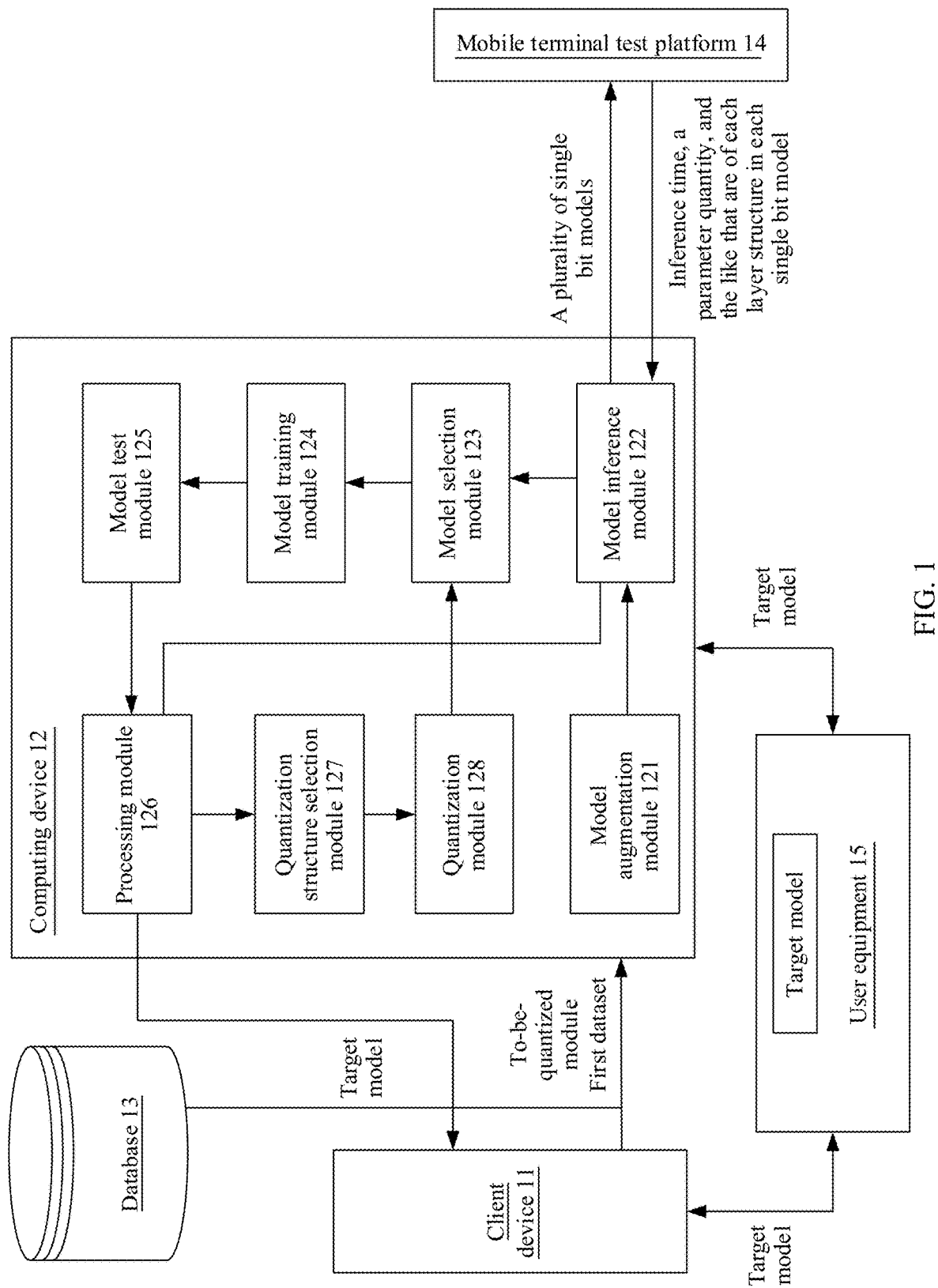
FIG. 1 is a schematic architectural diagram of a system according to an embodiment of this application.

Professional terms and concepts in this application are first described.

(1) Neural Network

The neural network may include neurons. The neuron may be an operation unit that uses $x_s$ and an intercept of 1 as input, where output of the operation unit may be as follows:

$$h_{w,b}(x) = f(W^T x) = f\left(\sum_{s=1}^{n} W_s x_s + b\right)$$

Herein, s=1, 2, ..., or n, n is a natural number greater than 1, $W_s$ is a weight of $x_s$, b is a bias of the neuron, and f is an activation function of the neuron, and is used to introduce a non-linear feature into the neural network, to convert an input signal in the neuron into an output signal. The output signal of the activation function may be used as input of a next convolutional layer. The activation function may be a sigmoid function. The neural network is a network formed by connecting many single neurons together. To be specific, output of a neuron may be input of another neuron. Input of each neuron may be connected to a local receptive field of a previous layer to extract a feature of the local receptive field. The local receptive field may be a region including several neurons.

(2) Deep Neural Network

The deep neural network (DNN), also referred to as a multi-layer neural network, may be understood as a neural network having many hidden layers. The "many" herein does not have a special measurement criterion. The DNN is divided based on locations of different layers, and a neural network in the DNN may be classified into three types: an input layer, a hidden layer, and an output layer. Usually, the first layer is the input layer, the last layer is the output layer, and the middle layer is the hidden layer. Layers are fully connected. To be specific, any neuron at an $i^{th}$ layer is definitely connected to any neuron at an $(i+1)^{th}$ layer. Although the DNN seems complex, the DNN is actually not complex in terms of work at each layer, and is simply represented as the following linear relationship expression: $y=\alpha(Wx+b)$, where x is an input vector, y is an output vector, b is a bias vector, W is a weight matrix (also referred to as a coefficient), and $\alpha(\ )$ is an activation function. At each layer, the output vector y is obtained only by performing such a simple operation on the input vector x. Because there are many layers in the DNN, there are also many coefficients W and bias vectors b. Definitions of these parameters in the DNN are as follows: The coefficient W is used as an example. It is assumed that in a DNN having three layers, a linear coefficient from the fourth neuron at the second layer to the second neuron at the third layer is defined as $W_{24}^3$. The superscript 3 represents a layer at which the coefficient W is located, and the subscript corresponds to an output third-layer index 2 and an input second-layer index 4. In conclusion, a coefficient from the kt neuron at an $(L-1)^{th}$ layer to a $j^{th}$ neuron at an $L^{th}$ layer is defined as $W_{jk}^L$. It should be noted that there is no parameter W at the input layer. In the deep neural network, more hidden layers make the network more capable of describing a complex case in the real world. Theoretically, a model with more parameters indicates higher complexity and a larger "capacity", and indicates that the model can be used to complete a more complex learning task. Training the deep neural network is a process of learning a weight matrix, and a final objective of the training is to obtain weight matrices (weight matrices formed by vectors W at many layers) of all layers of a trained deep neural network.

In this application, each model is the deep neural network, a layer structure of the model is the hidden layer, a model parameter of the model is a weight matrix at each hidden layer, and a model parameter of the layer structure is a weight matrix in the layer structure.

(3) Fixed Point (Fixed Point) and Floating Point (Floating Point)

Both the fixed point and the floating point are data types used by a computer to store data. A fundamental difference between the fixed point and the floating point lies in a location of a decimal point. A fixed-point number has a fixed bit quantity before and after a decimal point, but a floating-point number has no fixed bit quantity before and after a decimal point. To be specific, a location of the decimal point of the floating-point number may change relative to a significant digit of the number. The floating-point number provides a larger value range and higher precision than the fixed-point number.

The fixed-point number has a specific quantity of reserved numbers. A number on the left of the decimal point is an integral part of the fixed-point number, and a number on the right of the decimal point is a fractional part of the fixed-point number. For example, if a number length is 4 and a decimal point is in the middle, a maximum value that can be represented by the fixed-point number is 99.99, and a minimum value is 00.01 (a decimal number is used as an example herein, but a binary number is actually used on a computer). It can be learned that due to a form of a fixed window of the fixed-point number, the fixed-point number cannot represent a very large number or a very small number, and precision such as 4, 8, 16, or 32 of the fixed-point number is lost.

The floating-point number represents a real number in a form of scientific notation. Different from the fixed window of the fixed-point number, the floating-point number uses a floating window. Therefore, the floating-point number can represent a real number with a relatively large precision range. For example, 123.456 may be represented as $1.23456 \times 10^2$.

(4) All-Floating-Point Model, Single Bit Model, and Mixed Bit Model

The full-floating-point model is a deep neural network, and data types of model parameters (namely, weight matrices) of all layer structures in the full-floating-point model are represented by floating points.

The single bit model, also referred to as a single bit quantization model, is a deep neural network, and data types of model parameters (namely, weight matrices) of all layer structures in the single bit model are represented by fixed points with a same fixed bit quantity (bit quantity).

The mixed bit model, also referred to as a mixed bit quantization model, is a deep neural network, and data types of model parameters (namely, weight matrices) of different layers in the mixed bit model are represented by fixed points with a same fixed bit quantity or different fixed bit quantities (bit quantities). The single bit model is one of the mixed bit models, and the data types of the model parameters (namely, weight matrices) of all the layer structures in the single bit model are represented by the fixed points with the same fixed bit quantity (bit quantity).

(5) Model Quantization

In the embodiments of this application, the model quantization is neural network quantization, and is a model compression technology for converting floating-point storage (operation) into integer storage (operation). For example, a model parameter of a model is originally represented by float32 (a 32-bit floating point). After quantization, the model parameter of the model is represented by int8 (an 8-bit fixed point). An operation speed of the model is increased through the model quantization operation at the cost of a small precision loss.

The model quantization is essentially conversion/mapping between data of two data types. In an implementation of converting floating-point data (data whose data type is a floating point) into fixed-point data (data whose data type is a fixed point), the following formula may be used:

$$Q = \frac{R}{S} + Z$$

Herein, R is input floating-point data, Q is fixed-point data obtained after the floating-point data R is quantized, Z represents a zero point, and S represents a ratio. It can be learned that after S and Z are determined, conversion between the two pieces of data can be performed. S and Z are determined in many manners. For example, details are as follows:

$$S = \frac{R_{max} - R_{min}}{Q_{max} - Q_{min}}$$

$$Z = Q_{max} - R_{max}/S$$

Herein, $R_{max}$ represents a maximum value of the input floating-point data, $R_{min}$ represents a minimum value of the input floating-point data, $Q_{max}$ represents a maximum value of the fixed-point data, and $R_{min}$ represents a minimum value of the fixed-point data.

For conversion between fixed-point data with different bit quantities (where 1 bit=1 bit), refer to the foregoing conversion manner between the floating-point data and the fixed-point data, or refer to another conversion manner in the conventional technology. Details are not described herein.

In an implementation, conversion into 4-bit data or 8-bit data may be performed with reference to the foregoing conversion manner. An implementation of conversion between floating-point data and 2-bit (1-bit) data may be performed by using the following formula:

$$f(x) = \begin{cases} 1, & x \geq T \\ 0, & -T \leq x < T \\ -1, & x \leq -T \end{cases}$$

Herein, the 2-bit data may be represented as three numbers: −1, 0, and 1. T is a threshold. When the floating-point data is greater than or equal to T, the 2-bit fixed-point data obtained through conversion is 1. If the floating-point data is less than −T, the floating-point data is converted into −1. If the floating-point data is another value, the floating-point data is converted into 0. A conversion manner of the 1-bit data is similar to that of the 2-bit data, but fixed-point values of the 1-bit data are only −1 and 1, where a value of T is 0.

The following describes a system architecture in the embodiments of this application. FIG. 1 is a schematic architectural diagram of a system according to an embodiment of this application.

A client device 11 may send a first dataset and a to-be-quantized model to a computing device 12. The to-be-quantized model may be a full-floating-point model, may be a deep neural network obtained through training by using the first dataset, may be a constructed untrained deep neural network, or may be a deep neural network obtained through automatic machine learning (AutoML). The client device 11 may request the computing device 12 to quantize the to-be-quantized model, to obtain a mixed bit model whose accuracy, inference time, parameter quantity, and the like all meet their respective requirements of a client. The client device 11 may also send, to the computing device 12, standards such as target accuracy, target inference time, and a target parameter quantity that are of the mixed bit model obtained through quantization by the computing device 12.

In an embodiment, the first dataset may come from a database 13, and the first dataset includes a plurality of samples. In a scenario, the sample may be an image labeled as an object type. Both the to-be-quantized model and the mixed bit model that the client expects to obtain are deep neural networks with an image recognition capability. After receiving a to-be-recognized image, the deep neural networks may recognize an image category of the to-be-recognized image. In addition to the foregoing scenario, in another scenario, for example, the sample may alternatively be an image labeled as a gesture type. Both the to-be-quantized model and the mixed bit model that the client expects to obtain are deep neural networks with a gesture recognition capability. After receiving a to-be-recognized image, the deep neural network may recognize a gesture of the to-be-recognized image.

After receiving the to-be-quantized model, the computing device 12 may quantize the to-be-quantized model based on the one or more requirements of the client, to obtain a mixed quantization model whose accuracy is greater than a target accuracy, whose inference time is greater than a target inference time, and whose parameter quantity is less than a target parameter quantity. In a embodiment, the computing device 12 may first quantize the to-be-quantized model to obtain a plurality of single bit models, where each single bit model has a same network structure as the to-be-quantized model, but model parameters of the single bit model and the to-be-quantized model have different data types and bit quantities, and then send the plurality of obtained single bit models to a mobile terminal test platform 14.

The mobile terminal 14 includes a test system. When each single bit model is run on the mobile terminal 14, the mobile terminal may obtain parameters such as inference time and a parameter quantity that are of each layer structure in each single bit model by using the test system. In other words, the mobile terminal obtains inference time and parameter quantities that are of layer structures represented by fixed points with different bit quantities. The mobile terminal 14 may send, to the computing device 12, the inference time, the parameter quantity, and the like that are of each layer structure in each single bit model and that are obtained through testing.

The computing device 12 may perform at least one model search process. The process includes: The computing device 12 may train a candidate model in a candidate set by using a small quantity of samples, to obtain test accuracy of each candidate model, and then select a candidate model from the candidate set based on the test accuracy, and train and test the candidate model by using the first dataset, to obtain a trained candidate model (namely, a target model) and accuracy of the target model. If the target model does not meet the requirement of the client, the computing device 12 selects, based on inference time, a parameter quantity, and/or the like of a layer structure in the target model, a layer structure that needs to be quantized, and quantizes the selected layer structure in the target model, to obtain one or more quantized models. It should be understood that before and after the target model is quantized, only an expression of a model parameter of the selected layer structure changes, but an expression of a model parameter of another layer structure remains unchanged. Further, the computing device 12 adds the model obtained through quantization to the candidate set, and repeats a next model search process. It should be understood that the target model is output only when the target model meets the requirement of the user, and the output target model is the mixed bit model required by the client.

The computing device 12 may send the output target model to the client device 11. User equipment 15 (the mobile terminal) may download the target model from the client device 11 or the computing device 12, to use the target model. Compared with the to-be-quantized model, in the target model, some precision is sacrificed, but an operation speed is greatly increased, and therefore a complex deep neural network is applied to a mobile terminal with a relatively low memory capacity and relatively low memory bandwidth.

The computing device 12 may include a plurality of modules/nodes. The computing device 12 may be a distributed computing system, and the plurality of modules/nodes included in the computing device 12 may be computer devices having a computing capability. Alternatively, the computing device 12 may be a device, and the plurality of modules/nodes included in the computing device 12 may be function modules/components or the like in the computing device 12. The model augmentation module 121 is configured to generate a plurality of single bit models based on the to-be-quantized model. The model inference module 122 is configured to exchange information with the mobile terminal to obtain inference time and a parameter quantity that are of each layer structure in each single bit model. The model selection module 123 is configured to select a candidate model from a candidate set. The model training module 124 is configured to train the selected candidate model, to obtain a target model. The model test module 125 is configured to test the target model, to obtain accuracy of the target model. The processing module 126 is configured to: determine whether a target model meets a requirement of a client, and output the target model after the target model meets the requirement of the client. The quantization structure selection module 127 is configured to: when the target model does not meet the requirement of the client but the accuracy of the target model meets the requirement of the client, select, based on a quantization weight of each layer structure in the target model, a layer structure with a maximum quantization weight in the target model as a layer structure that needs to be quantized. The quantization module 128 is configured to: quantize the selected layer structure in the target model to obtain a quantized model, and add the quantized model to the candidate set.

The computing device 12 and the modules in the computing device 12 each may be a cloud server, a server, a computer device, a terminal device, and the like. Details are not described herein.

The client device 11 or the user equipment 15 may be a mobile phone, a tablet computer, a personal computer, a vehicle, a vehicle-mounted unit, a point of sales (POS), a personal digital assistant (PDA), an unmanned aerial vehicle, a smart watch, smart glasses, a VR device, or the like. This is not limited herein. The client device 11 may alternatively be a server.

The client device 11, the user equipment 15, and the database 13 in the system are not devices required by the system. The system does not include the foregoing devices, or may include other devices or function units. This is not limited in this embodiment of this application.

Figure 2:
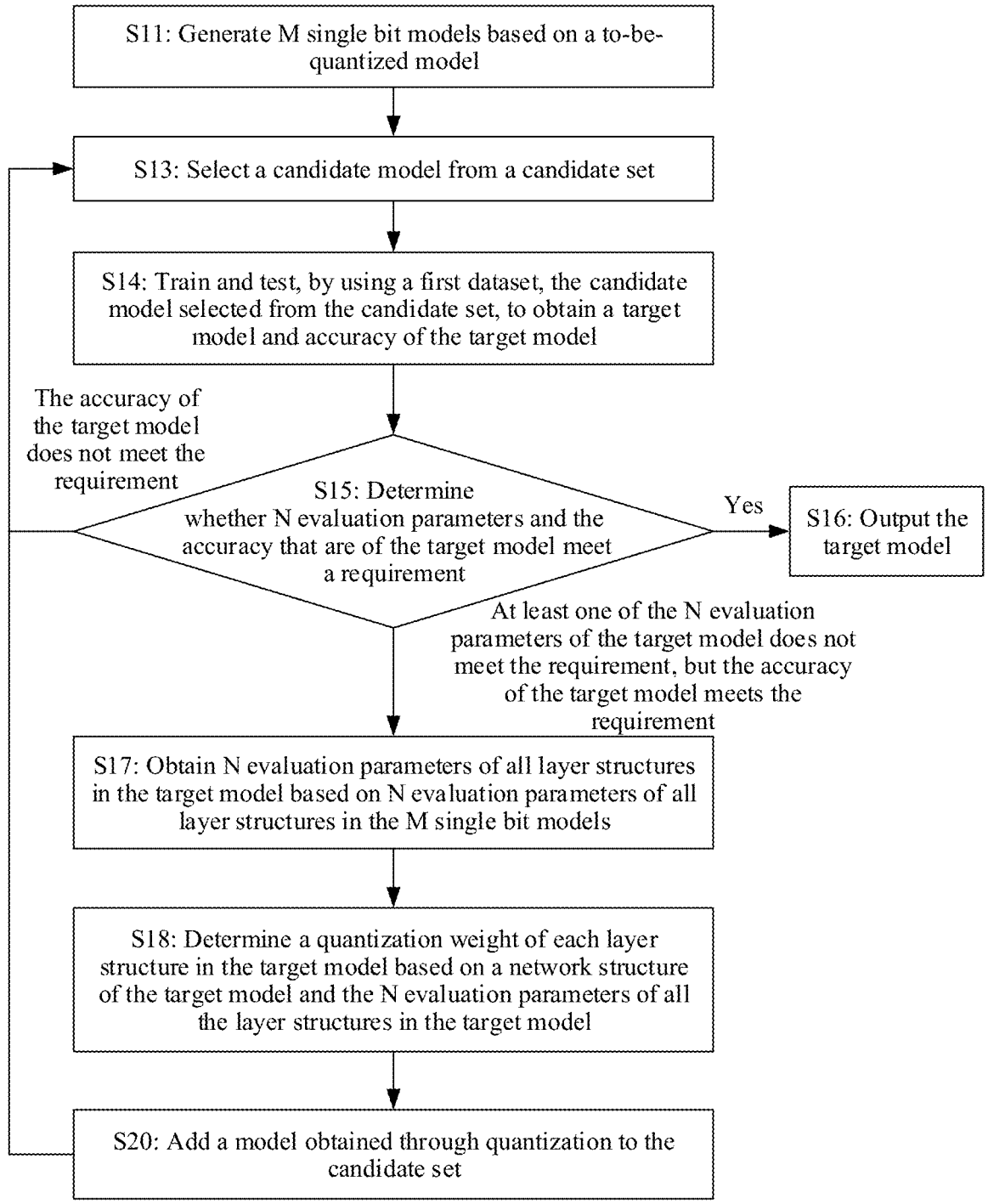
FIG. 2 is a schematic flowchart of a machine learning model search method according to an embodiment of this application.
Figure 3A:
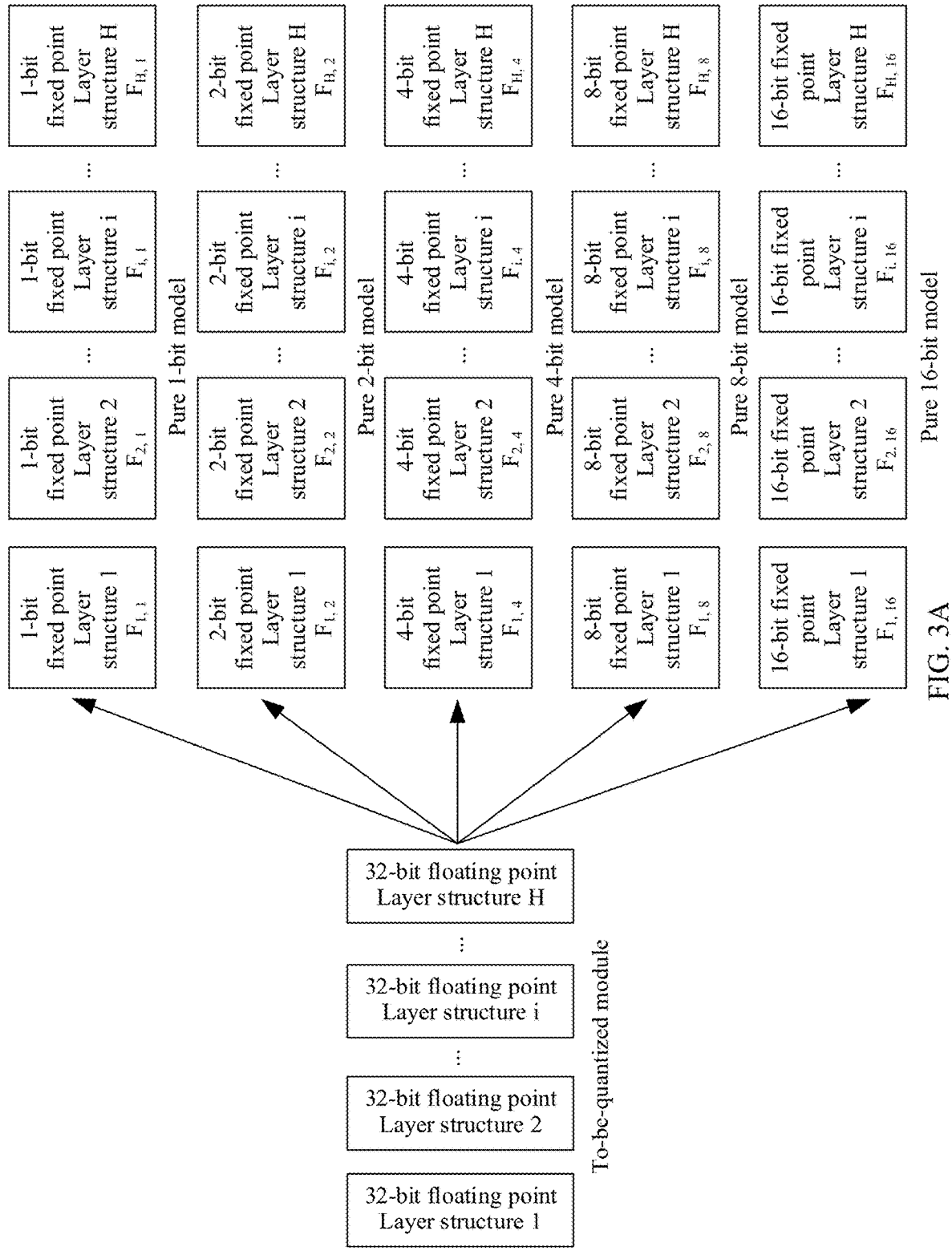
FIG. 3A to FIG. 3C each are a schematic illustration diagram of a machine learning model search process according to an embodiment of this application.
Figure 3B:
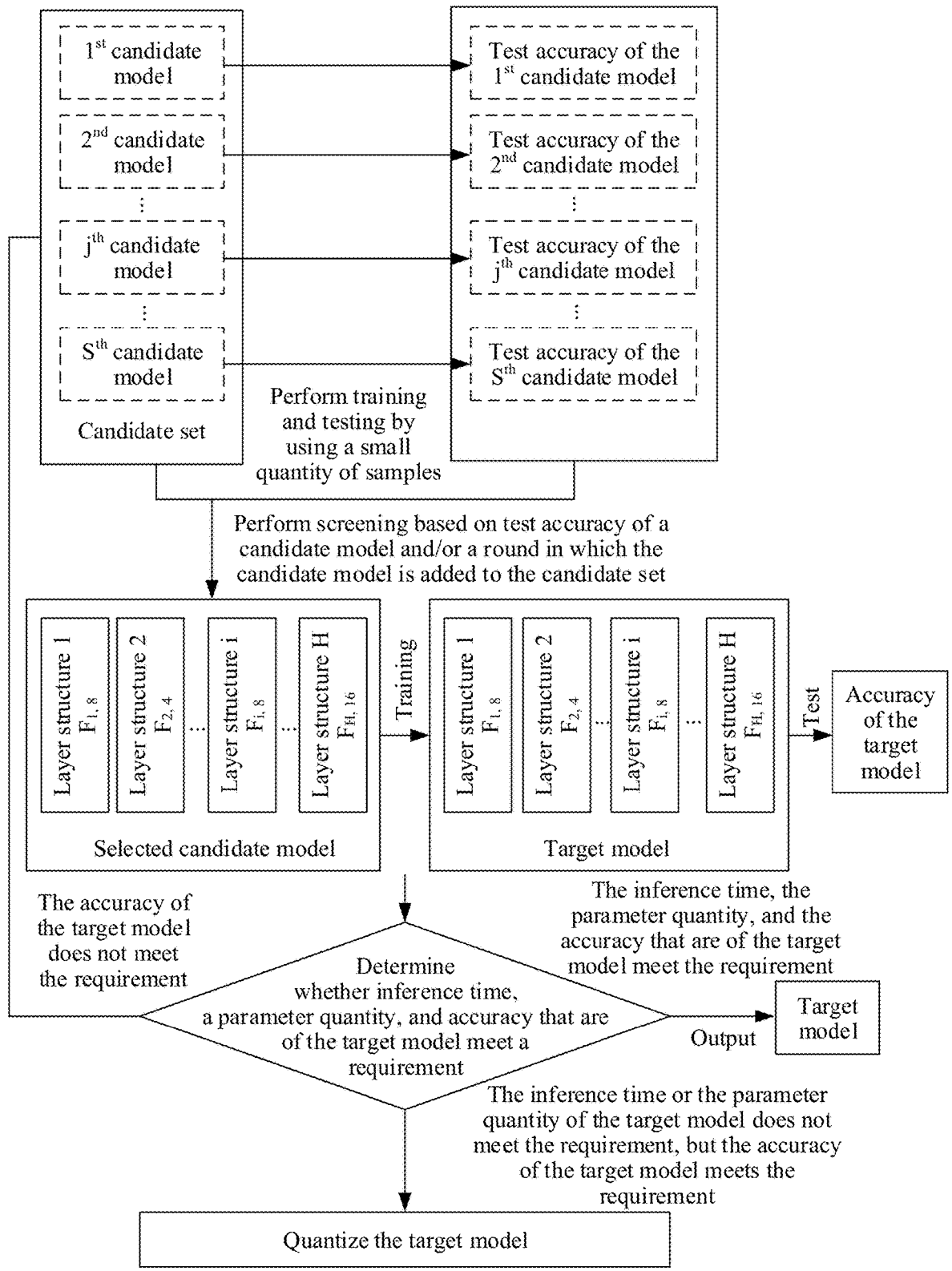
Figure 3C:
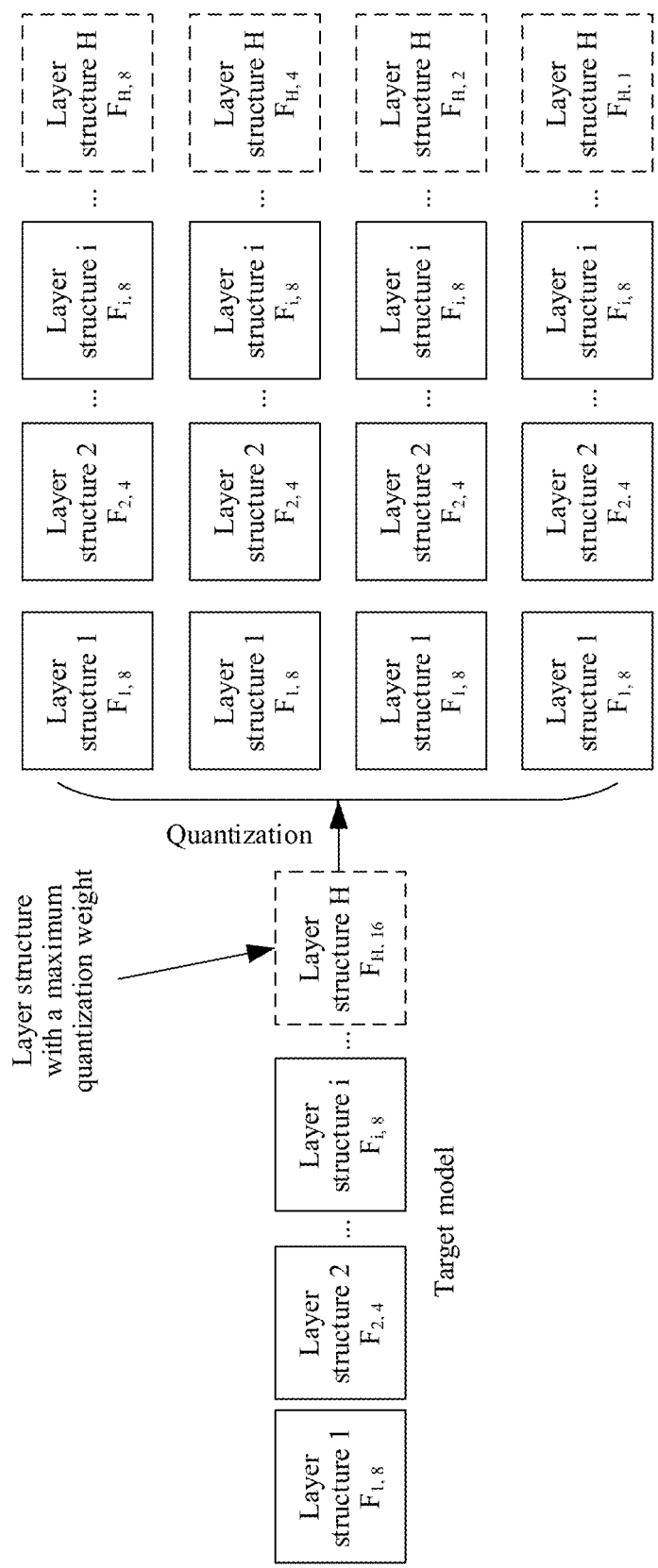

The following describes a machine learning model search method provided in an embodiment of this application. The method may be performed by the computing device in FIG. 1. Optionally, operation S11 may also be performed or implemented by the model augmentation module 121. Operation S12 may also be performed or implemented by the model inference module 122. Operation S13 may be performed or implemented by the model selection module 123. Operation S14 may be implemented by the model training module 124 and the model test module 125. Operations S15 and S16 may be implemented by the processing module 126. Operations S17 and S18 may be performed or implemented by the quantization structure selection module 127. Operations S19 and S20 may also be implemented by the quantization module 128. Optionally, the method 60 or the operations in the method may be separately processed by a CPU, may be jointly processed by a CPU and a GPU, or may be processed by another processor suitable for neural network computation such as a neural network processor, instead of a GPU. This is not limited herein. In this embodiment of this application, descriptions are provided by using an example in which an execution body is the computing device. FIG. 2 is a schematic flowchart of a machine learning model search method. FIG. 3A to FIG. 3C each are a schematic illustration diagram of a machine learning model search process. The method may include but is not limited to some or all of the following operations.

S11: Generate M single bit models based on a to-be-quantized model.

The to-be-quantized model may be a full-floating-point model or a mixed model. Herein, the full-floating-point model is a model in which data types of model parameters are all floating points, the mixed model is a model in which data types of some model parameters are floating points and data types of some model parameters are fixed points, and each of the M single bit models is a model in which data types of model parameters are all fixed points and bit quantities of the model parameters are the same.

The single bit model and the to-be-quantized model are deep neural networks with a same network structure, and model parameters of the single bit model and the to-be-quantized model have different data types. Optionally, the to-be-quantized model may be a trained deep learning model, or may be a constructed untrained machine learning model.

The M single bit models are generated based on the to-be-quantized model. To be specific, data types of the model parameters of the to-be-quantized model are converted into fixed points with different bit quantities. A layer structure is coded. A layer structure i in a single m-bit model may also be referred to as an m-bit layer structure i, and may be represented as $F_{i,m}$. The layer structure $F_{i,m}$ indicates that a data type of a model parameter of the layer structure n is an m-bit fixed point. Herein, m and n are positive integers, m is usually not greater than a bit quantity of a model parameter of the to-be-quantized model, and n is not greater than a total quantity of layers of layer structures in the to-be-quantized model/single bit model.

For example, referring to FIG. 3A that is the schematic illustration diagram of quantizing the full-floating-point model into five single bit models, the to-be-quantized model is a 32-bit full-floating-point model, and includes H layer structures, that is, layer structures i, where i=1, 2, . . . , and H, H is a total quantity of layers of the layer structures in the to-be-quantized model, and H is a positive integer. The full-floating-point model may be converted into the five single bit models: a single 1-bit model, a single 2-bit model, a single 4-bit model, a single 8-bit model, and a single 16-bit model. It should be noted that the foregoing five single bit models obtained through conversion are used as an example for description. In another embodiment, the to-be-quantized model may also be converted into single bit models in which bit quantities are 3, 5 to 7, 9 to 16, 17 to 32, and the like. Herein, an example in which the bit quantities are 1, 2, 4, 8, and 16 is used for description.

S12: A mobile terminal runs the M single bit models, to obtain N evaluation parameters of all layer structures in the M single bit models, where the N evaluation parameters include inference time and/or a parameter quantity.

In a specific implementation of S12, the computing device may send the M single bit models to the mobile terminal, and the mobile terminal may perform a benchmark test on the M single bit models, for example, enter the single bit models to a model performance evaluator, to obtain inference time and a parameter quantity that are of each layer structure in the single bit models. The mobile terminal may further send, to the computing device, the inference time and the parameter quantity that are of each layer structure in the M single bit models and that are obtained through testing. It should be understood that, for two layer structures with a same structure, if bit quantities of model parameters of the two layer structures are different, inference time of the two layer structures is usually different, and a layer structure with a larger bit quantity has longer inference time. It should be understood that the benchmark test is a method for testing code performance, and the model performance evaluator is an algorithm/a program used to test inference time and/or a parameter quantity of each layer structure in the deep neural model.

In operation S12, the inference time of each layer structure when a model parameter of each layer structure in the to-be-quantized model has a different bit quantity, and the parameter quantity of each layer structure may be obtained. In other words, the inference time and the parameter quantity that are of the layer structure $F_{i,\,m}$ may be obtained, where $1 \leq i \leq H$, and m belongs to a bit quantity set. H is the total quantity of layers of the layer structures in the to-be-quantized model/single bit model. The bit quantity set includes M values that are bit quantities of model parameters of the M single bit models. In the examples shown in FIG. 3A to FIG. 3C, the bit quantity set may be $\{1, 2, 4, 8, 16\}$.

In some other embodiments, the parameter quantity of each layer structure in the to-be-quantized model may also be obtained by the computing device.

It should be understood that the parameter quantity is used to indicate a data amount of a model parameter of a model or a layer structure. Before and after data type conversion is performed on the to-be-quantized model, a quantity of model parameters of each layer structure remains unchanged, but a bit quantity of each model parameter changes. It may be understood that the parameter quantity of the layer structure is not only related to the quantity of model parameters of the layer structure, but also related to a bit quantity of a model parameter. A larger quantity of model parameters and a larger bit quantity of a model parameter indicate a larger parameter quantity of the layer structure. In other words, for a same layer structure in a single bit model, a smaller bit quantity indicates a smaller parameter quantity.

S13: Select a candidate model from a candidate set.

It should be understood that a model in the candidate set in this application is also referred to as the candidate model. The candidate set may initially include one candidate model, and the candidate model may be a single bit model with a largest bit quantity in the M single bit models. In this case, the selected model is the single bit model with the largest bit quantity. It should be understood that the candidate model in the candidate set is a mixed bit model having a same network structure as the to-be-quantized model. In another implementation, the candidate set may initially include one or more mixed bit models, and a network structure of the mixed bit model is the same as a network structure of the to-be-quantized model.

The candidate model in the candidate set continuously changes in a model search process. A model selected in each model search process is removed from the candidate set, and a model obtained through low-bit quantization in each model search process is added to the candidate set.

That the computing device selects a candidate model from a candidate set may include but is not limited to the following three implementations:

Implementation 1: The computing device randomly selects a candidate model from the candidate set.

The computing device may select a model based on accuracy of the candidate model in the candidate set. All candidate models in the candidate set are untrained and untested models. To reduce computing resources, time, and the like occupied during model training and testing, in this embodiment of this application, lightweight training and testing may be performed on the candidate model by using a small quantity of samples (also referred to as a second dataset in this application). To be specific, each candidate model in the candidate set is trained and tested by using the second data set, to obtain accuracy of each trained candidate model. To distinguish from accuracy obtained by training and testing the candidate model by using a large quantity of samples (also referred to as a first dataset in this application), the accuracy obtained by using the small quantity of samples is referred to as test accuracy herein. It should be understood that a quantity of samples in the first dataset is greater than a quantity of samples in the second dataset, and the second dataset may be some samples in the first dataset.

Implementation 2: As shown in FIG. 3B, the computing device may comprehensively select a candidate model based on test accuracy of the candidate model and a weight of the candidate model. In an implementation, the weight of the candidate model is related to a total quantity of times of model search performed when the candidate model is added to the candidate set. Optionally, the weight of the candidate model may be determined based on the total quantity of times of model search performed when the candidate model is added to the candidate set and a total quantity of times of current model search. For example, a smaller difference between the total quantity of times of model search performed when the candidate model is added to the candidate set and the total quantity of times of current model search indicates a higher weight of the candidate model, and a higher probability of selecting a candidate model obtained through quantization in a last model search process.

For example, in the third model search process, a first candidate model is obtained by quantizing the selected candidate model, and the first candidate model is added to the candidate set in the third model search process (in other words, the total quantity of times of model search performed when the first candidate model is added to the candidate set is 3). In this case, in the fourth model search process, because the first candidate model is added to the candidate set in a last model search process, a larger weight is set for the first candidate model relative to the candidate model that has been added to the candidate set in the model search performed for the third time, so that the first candidate model is preferentially selected. However, if the first candidate model is not selected in the fourth model search process, a weight of the first candidate model becomes smaller as the model search is performed. For example, in the eighth model search process, the weight of the first candidate model is less than a weight of each of candidate models obtained through model search performed for the fifth, sixth, and seventh times. However, when test accuracy of the first candidate model is higher than test accuracy of each of the candidate models obtained through the model search performed for the fifth, sixth, and seventh times, and the first candidate model remains to be selected, according to the candidate model selection method, a candidate model obtained through last model search may be tried to be selected on a basis of preferentially selecting a candidate model with higher test accuracy.

In another implementation, a probability/weight $Q_j$ of selecting a $j^{th}$ candidate model in the candidate set may be represented as follows:

$$Q_j = \text{softmax}(w_j A_j) \quad (1)$$

Herein, $A_j$ is test accuracy of the $j^{th}$ candidate model, and $w_j$ is a weight of the $j^{th}$ candidate model.

To better differentiate a probability/weight $Q_j$ of selecting each candidate model, the computing device may perform sharpening processing on the probability/weight $Q_j$ of selecting each candidate model. For example, a probability/weight $Q_j$ of selecting the $j^{th}$ candidate model in the candidate set is processed by using a sharpening algorithm, to obtain a processed probability/weight $D_j$. The processed probability/weight $D_j$ may be represented as follows:

$$D_j = \frac{Q_j^{1/C}}{\sum_j^S Q_j^{1/C}} \quad (2)$$

Herein, C is a constant, j is a positive integer, j≤S, and S is a total quantity of candidate models in the candidate set.

Implementation 3: The computing device may alternatively select a candidate model with highest test accuracy in the candidate models.

In an implementation, a probability/weight $Q_j$ of selecting a $j^{th}$ candidate model in the candidate set may be represented as follows:

$$Q_j = \text{softmax}(A_j) \quad (3)$$

Herein, $A_j$ is test accuracy of the $j^{th}$ candidate model. Same as Implementation 2, the probability/weight $Q_j$ of selecting the $j^{th}$ candidate model in the candidate set may be processed by using a sharpening algorithm, to obtain a processed probability/weight $D_j$. For a specific implementation, refer to Implementation 2. Details are not described herein again.

In some embodiments, a $k^{th}$ model search process is used as an example for description. Before model search performed for a $k^{th}$ time, the candidate set may include at least one model obtained through low-bit quantization in first (k−1) model search processes. According to the foregoing method, a candidate model is selected based on accuracy, so that a model with higher accuracy is selected, and a model obtained through each round of model search may be selected, to avoid performing local optimal model search, and improve accuracy of the found model. Further, in Implementation 2, a weight of the candidate model is set based on a round, so that when a search round is closer to a current search round, a probability/weight of the candidate model obtained in the search round is higher. Therefore, a candidate model obtained in a last round is preferentially selected.

In some other embodiments, before model search performed for a $k^{th}$ time, the candidate set includes only at least one model obtained through low-bit quantization in a (k−1)th model search process. In this case, a model obtained through low-bit quantization in first (k−2) model search processes is not considered in a model search process, so that search space can be reduced, an experimental training workload can be reduced, and a model search process can be accelerated.

It should be noted that in different rounds of search processes, implementations of selecting a candidate model from the candidate set may be the same or different. It should be further noted that after the candidate model is selected from the candidate set, the selected candidate model (namely, a target model) is removed from the candidate set, to prevent the target model from being selected for a plurality of times.

S14: Train and test, by using a first dataset, the candidate model selected from the candidate set, to obtain a target model and accuracy of the target model.

The first dataset includes a plurality of samples, and the first dataset may be divided into a first training dataset and a first test dataset. The candidate model selected from the candidate set is trained by using the first training dataset, to obtain a trained model (namely, the target model in this application). Further, the target model is tested by using the first test dataset, to obtain the accuracy of the target model.

S15: Determine whether N evaluation parameters of the target model and the accuracy of the target model meet a requirement; and if both the N evaluation parameters of the target model and the accuracy of the target model meet the requirement, perform S16; if at least one of the N evaluation parameters of the target model does not meet the requirement but the accuracy of the target model meets the requirement, quantize the target model, that is, perform S17 to S20; or if the accuracy of the target model does not meet the requirement, re-perform S12 to select a new target model from the candidate set.

The N evaluation parameters may include inference time and/or a parameter quantity. The inference time of the target model may be obtained through calculation based on the inference time that is of each layer structure in the M single bit models and that is obtained by the mobile terminal through testing. Similarly, the parameter quantity of the target model may also be obtained through calculation based on the parameter quantity that is of each layer structure in the M single bit models and that is obtained by the mobile terminal through testing. For example, the to-be-quantized model/target model includes H layer structures, and the layer structures in the target model are respectively represented as $F_{1, 8}, F_{2, 4}, \ldots, F_{i, 8}, \ldots,$ and $F_{H, 16}$. In this case, the inference time of the target model is a sum of inference time of the layer structures $F_{1, 8}, F_{2, 4}, \ldots, F_{i, 8}, \ldots,$ and $F_{H, 16}$, and the parameter quantity of the target model is a sum of parameter quantities of the layer structures $F_{1, 8}, F_{2, 4}, \ldots, F_{i, 8}, \ldots,$ and $F_{H, 16}$.

Implementation (1) of determining whether the N evaluation parameters of the target model meet the requirement may be: determining whether the inference time of the target model is less than a target time threshold, and determining whether the parameter quantity of the target model is less than a target parameter quantity; and if the inference time of the target model is less than the target time threshold and the parameter quantity of the target model is less than the target parameter quantity, determining that the N evaluation parameters of the target model meet the requirement; or if the inference time of the target model is not less than the target time threshold or the parameter quantity of the target model is not less than the target parameter quantity, determining that at least one of the N evaluation parameters of the target model does not meet the requirement. In another implementation, the N evaluation parameters may include inference time or a parameter quantity. Further, for a specific implementation of determining whether the inference time or the parameter quantity of the target model meets the requirement, refer to the related descriptions in Implementation (1). Details are not described herein again.

An implementation of determining whether the accuracy of the target model meets the requirement may be: determining whether the accuracy of the target model is greater than a target threshold, for example, 0.76, 0.8, or 0.9; and if the accuracy of the target model is greater than the target threshold, determining that the accuracy of the target model meets the requirement; or if the accuracy of the target model is not greater than the target threshold, determining that the accuracy of the target model does not meet the requirement.

It should be understood that the target inference time, the target parameter quantity, and the target threshold may be values that are set by a client or a user, and indicate a criterion that is expected by the user and that the target model meets.

S16: Output the target model.

When the N evaluation parameters of the target model meet the requirement and the accuracy of the target model meets the requirement, it indicates that the current target model meets the requirement of the client. In this case, the target model may be output, and the target model may be further sent to the client device or the user terminal.

S17: Obtain N evaluation parameters of all layer structures in the target model based on the N evaluation parameters of all the layer structures in the M single bit models.

Inference time and a parameter quantity that are of each layer structure in the target model may be obtained based on the inference time and the parameter quantity that are of each layer structure $F_{i,\,m}$ and that are obtained in operation S12. Herein, 1≤i≤H, and m belongs to a bit quantity set.

S18: Determine a quantization weight of each layer structure in the target model based on a network structure of the target model and the N evaluation parameters of all the layer structures in the target model. The quantization weight is used to select a layer structure that is in the target model and on which low-bit quantization is performed. For a specific implementation of determining the quantization weight of the layer structure, refer to the following specific implementation of determining a quantization weight $P_i$ of a layer structure i in the target model. Details are not described herein.

In an implementation of operation S18, if the inference time of the target model is greater than the target inference time and the parameter quantity of the target model is not greater than the target parameter quantity, a quantization weight of the layer structure i in the target model is determined based on inference time of the layer structure i in the target model and a weight of the layer structure i in the target model. If the inference time of the target model is not greater than the target inference time and the parameter quantity of the target model is greater than the target parameter quantity, a quantization weight of the layer structure i in the target model is determined based on a parameter quantity of the layer structure i in the target model and a weight of the layer structure i in the target model. If the inference time of the target model is greater than the target inference time and the parameter quantity of the target model is greater than the target parameter quantity, a quantization weight of the layer structure i in the target model is determined based on inference time of the layer structure i in the target model, a parameter quantity of the layer structure i in the target model, and a weight of the layer structure i in the target model.

A method for determining a quantization weight of each layer structure in the target model is described by using an example in which the quantization weight $P_i$ of the layer structure i in the target model is determined. The quantization weight $P_i$ of the layer structure i in the target model is as follows:

$$P_i = softmax\{O_i[\alpha L_i * f(T) + \beta R_i * f(M)]\} \quad (4)$$

$$f(x) = \begin{cases} x, & x > 1 \\ 0, & x \le 1 \end{cases} \quad (5)$$

Herein, $\alpha$ and $\beta$ are respectively weights of the inference time and the parameter quantity, and may be constants, for example, empirical values; $O_i$ is the weight of the layer structure i; $L_i$ is the inference time of the layer structure i or a ratio of the inference time of the layer structure i to the inference time of the target model; $R_i$ is the parameter quantity of the layer structure i or a ratio of the parameter quantity of the layer structure i to the parameter quantity of the target model; T is a ratio of the inference time of the target model to the target inference time; and M is a ratio of the parameter quantity of the target model to the target parameter quantity.

Optionally, accuracy of a layer structure that is in the model and that is closer to input data usually has greater impact on the accuracy of the model. To maintain accuracy of a quantized model to a greatest extent, a location of the layer structure may be considered for the quantization weight of the layer structure in the target model. Based on this factor, the weight of the layer structure is set, and therefore a layer structure that has little impact on the accuracy of the model may be preferentially selected for quantization. The weight of the layer structure is related to the location of the layer structure in the model, and may be a preset value. Usually, a layer structure closer to the input data has a smaller weight, and a layer structure closer to output data has a larger weight.

In a second implementation of operation S18, a location of the layer structure may not be considered, and the weight of the layer structure is not set. In this case, the quantization weight $P_i$ of the layer structure i in the target model may be represented as follows:

$$P_i = softmax[\alpha L_i * f(T) + \beta R_i * f(M)] \quad (6)$$

For meanings of the parameters in Formula (6), refer to the related descriptions in the first implementation of operation S18. Details are not described herein again. It can be learned that the quantization weight of each layer structure in the target model may be obtained by using Formula (4)/Formula (6) and Formula (5). When the inference time of the target model is less than the target inference time and the parameter quantity of the target model is not less than the target parameter quantity, it indicates that the inference time of the target model meets the requirement but the parameter quantity of the target model does not meet the requirement. In this case, f(T)=0, f(M)=M, and the parameter quantity of the layer structure is mainly considered for the quantization weight $P_i$ of the layer structure i in the target model. When the inference time of the target model is not less than the target inference time and the parameter quantity of the target model is less than the target parameter quantity, it indicates that the inference time of the target model does not meet the requirement but the parameter quantity of the target model meets the requirement. In this case, f(T)=T, f(M)=0, and the inference time of the layer structure is mainly considered for the quantization weight $P_i$ of the layer structure i in the target model. When the inference time of the target model is not less than the target inference time and the parameter quantity of the target model is not less than the target parameter quantity, it indicates that neither the inference time of the target model nor the parameter quantity of the target model meets the requirement. In this case, f(T)=T, f(M)=M, and both the inference time and the parameter quantity that are of the layer structure are considered for the quantization weight $P_i$ of the layer structure i in the target model.

S19: Quantize a layer structure with a maximum quantization weight in the target model, to obtain a quantized model.

Herein, the quantization is low-bit quantization, and the low-bit quantization is converting a bit quantity of a model parameter of a selected layer structure in the target model into a bit quantity less than the bit quantity of the current model parameter. A specific implementation includes: converting a model parameter of the layer structure with the maximum quantization weight in the target model into a model parameter represented by at least one bit quantity, where the at least one bit quantity is a bit quantity that is in a bit quantity set and that is less than a current bit quantity of the model parameter of the layer structure with the maximum quantization weight in the target model, the bit quantity set includes M values, and the M values are used to indicate bit quantities of model parameters of the M single bit models.

For example, as shown in FIG. 3C, a bit quantity set={1, 2, 4, 8, 16}, and a selected layer structure in the target model (including $F_{1, 8}$, $F_{2, 4}$, ..., $F_{i, 8}$, ..., and $F_{H, 16}$) is $F_{H, 16}$. In this case, the layer structure $F_{H, 16}$ may be quantized to obtain $F_{H, 1}$, $F_{H, 2}$, $F_{H, 4}$, and $F_{H, 8}$, and therefore models obtained after low-bit quantization are respectively a model (including $F_{1, 8}$, $F_{2, 4}$, ..., $F_{i, 8}$, ..., and $F_{H, 1}$), a model (including $F_{1, 8}$, $F_{2, 4}$, ..., $F_{i, 8}$, ..., and $F_{H, 2}$), a model ($F_{1, 8}$, $F_{2,4}$, ..., $F_{i, 8}$, ..., and $F_{H, 4}$), and a model (including $F_{1,8}$, $F_{2, 4}$, ..., $F_{i, 8}$, ..., and $F_{H, 8}$).

Optionally, after operation S18 and before operation S19, the computing device may alternatively determine a bit quantity obtained after the selected layer structure $F_{H, 16}$ is quantized. For example, the layer structure $F_{H, 16}$ may be selected to be quantized to obtain $F_{H, 4}$ and $F_{H, 8}$. In this case, in comparison with FIG. 3C, in this example, a quantity of quantized models added to the candidate set can be reduced, model search space can be reduced, and a model search process can be accelerated.

S20: Add a model obtained through quantization to the candidate set.

In some embodiments, all the models such as the model (including $F_{1,8}$, $F_{2,4}$, ..., $F_{i, 8}$, ..., and $F_{H, 1}$, the model (including $F_{1,8}$, $F_{2, 4}$, ..., $F_{i, 8}$, ..., and $F_{H, 2}$), the model ($F_{1,8}$, $F_{2, 4}$, ..., $F_{i, 8}$, ..., and $F_{H, 4}$), and the model (including $F_{1, 8}$, $F_{2, 4}$, ..., $F_{i, 8}$, ..., and $F_{H, 8}$) that are obtained through quantization may be added to the candidate set.

In some other embodiments, some candidate models obtained through quantization may also be added to the candidate set.

After performing operation S20 to update the candidate set, the computing device may re-perform some or all of operations S13 to S20. Operations S13 to S20 may be referred to as one time/round of model search. After model search performed for a plurality of times, the target model whose inference time, parameter quantity, and accuracy meet the requirement may be obtained.

The machine learning model search method shown in FIG. 2 may be applied to a plurality of scenarios, for example, an image classification scenario.

The to-be-quantized model may be a first image classification model, and the first image classification model may be used to classify an input image. The first dataset and the second dataset each include a plurality of images, and each image is labeled with a category. For example, the first dataset includes images labeled with "various plants" such as an image labeled with "Chrysanthemum", an image labeled with "Lotus", an image labeled with "Wheat", an image labeled with "Corn", and an image labeled with "Peony". In this case, the first image classification model may recognize a category of a plant in an image. The first image classification model is a full-floating-point model obtained through training by using the first dataset. To enable the first image classification model to be applied to the terminal, the machine learning model search method shown in FIG. 2 is used to quantize the first image classification model, so as to obtain a target model (namely, a second image classification model) whose inference time and parameter quantity both meet a requirement. The second image classification model is also an image classification model, and is a mixed bit model. Model structures of the second image classification model and the first image classification model are the same, but data types of model parameters of the second image classification model and the first image classification model are different.

Figure 4:
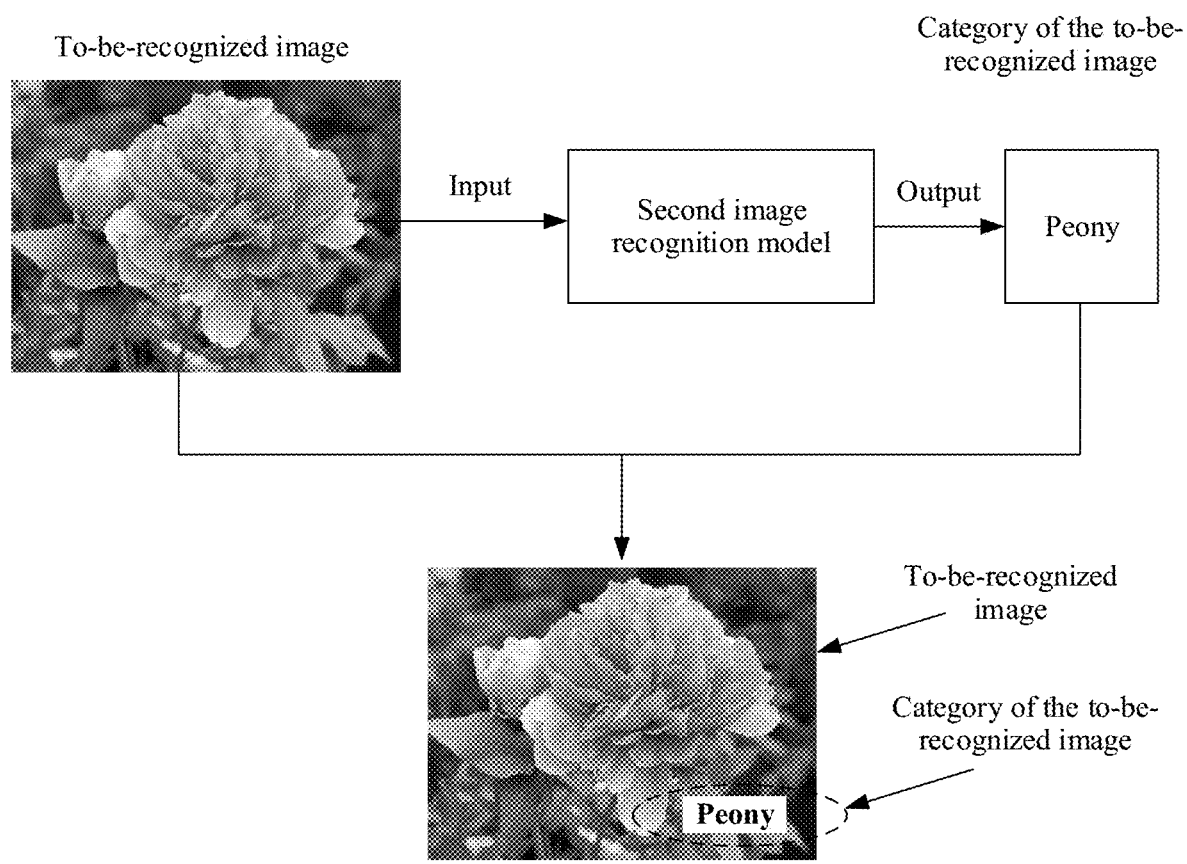
FIG. 4 is a schematic flowchart of an image recognition method according to an embodiment of this application.

The second image classification model is applied to the terminal, to classify an image. FIG. 4 shows an image recognition method according to an embodiment of this application. The method is performed by the terminal, and the method may include but is not limited to the following operations:

S41: Obtain a to-be-recognized image, where the to-be-recognized image may be an image that is in a current scene and that may be obtained by the terminal through a camera.

S42: Enter the to-be-recognized image into a second image recognition model to obtain a category of the to-be-recognized image, where the second image recognition model is a target model that is output by using a first image classification model as a to-be-quantized model according to the machine learning model search method shown in FIG. 2.

S43: Output the category of the to-be-recognized image.

In an implementation, the terminal may add the category of the to-be-recognized image to the to-be-recognized image. For example, if the current scene includes a peony, it may be identified, by using the second image recognition model, that the category of the to-be-recognized image is "Peony". In this case, the text "Peony" may be added to the to-be-recognized image.

The machine learning model search method shown in FIG. 2 is used to quantize the first image classification mode, so that an obtained second machine learning model can occupy a relatively small amount of memory and a relatively small quantity of computing resources, has a relatively fast image recognition speed, and can recognize a category of the image in a process of obtaining the image by using the camera, to output the recognition result to a user in real time.

In addition to the foregoing scenario, the machine learning model search method provided in this embodiment of this application may be used to process another to-bequantized model, to obtain a target model that meets a requirement, so as to be applied to a terminal.

The following describes an apparatus and a device in embodiments of this application.

Figure 5:
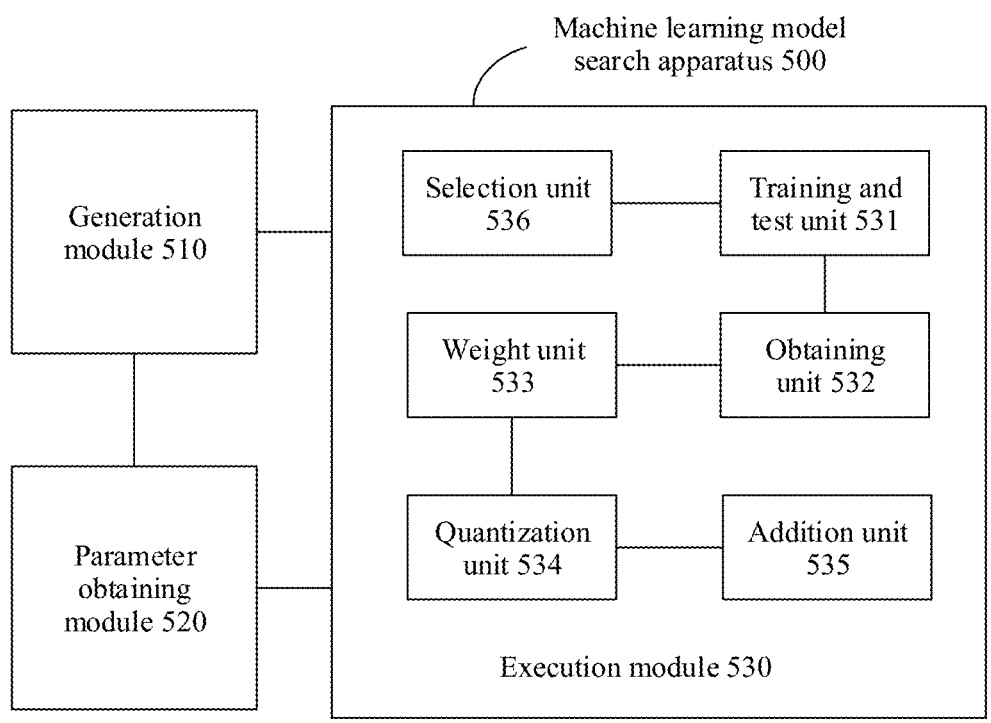
FIG. 5 is a schematic structural diagram of a machine learning model search apparatus according to an embodiment of this application.

FIG. 5 shows a machine learning model search apparatus according to an embodiment of this application. The apparatus 500 may be the computing device 12 in the system shown in FIG. 1. The apparatus 500 may include but is not limited to the following function units:

a generation module 510, configured to generate M single bit models based on a to-be-quantized model, where the single bit model and the to-be-quantized model are deep neural networks with a same network structure, and M is a positive integer greater than 1;

a parameter obtaining module 520, configured to obtain N evaluation parameters of all layer structures in the M single bit models, where the N evaluation parameters of all the layer structures in the M single bit models are obtained through measurement when a mobile terminal runs the M single bit models; and an execution module 530, configured to perform model search for at least one time, to output a model whose N evaluation parameters and accuracy meet a requirement, where the execution module 530 includes a training and test unit 531, an obtaining unit 532, a weight unit 533, a quantization unit 534, and an addition unit 535, and when the execution module 530 performs the model search process, the training and test unit 531 is configured to: train and test, by using a first dataset, a candidate model selected from a candidate set, to obtain a target model and accuracy of the target model, where the candidate set includes at least one candidate model, the candidate model is a mixed bit model having a same network structure as the to-be-quantized model, and the first dataset includes a plurality of samples used to train and test the candidate model in the candidate set;

the obtaining unit 532 is configured to: when at least one of N evaluation parameters of the target model does not meet a requirement and the accuracy of the target model is greater than a target threshold, obtain N evaluation parameters of all layer structures in the target model based on the N evaluation parameters of all the layer structures in the M single bit models;

the weight unit 533 is configured to determine a quantization weight of each layer structure in the target model based on a network structure of the target model and the N evaluation parameters of all the layer structures in the target model;

the quantization unit 534 is configured to quantize a layer structure with a maximum quantization weight in the target model; and the addition unit 535 is configured to add a model obtained through quantization to the candidate set.

In an embodiment, the N evaluation parameters include inference time and a parameter quantity, and the weight unit 533 is configured to:

if the inference time of the target model is greater than target inference time and the parameter quantity of the target model is not greater than a target parameter quantity, determine a quantization weight of a layer structure i in the target model based on inference time of the layer structure i in the target model and a weight of the layer structure i in the target model;

if the inference time of the target model is not greater than target inference time and the parameter quantity of the target model is greater than a target parameter quantity, determine a quantization weight of a layer structure i in the target model based on a parameter quantity of the layer structure i in the target model and a weight of the layer structure i in the target model; or if the inference time of the target model is greater than target inference time and the parameter quantity of the target model is greater than a target parameter quantity, determine a quantization weight of a layer structure i in the target model based on inference time of the layer structure i in the target model, a parameter quantity of the layer structure i in the target model, and a weight of the layer structure i in the target model.

In another embodiment, the execution module 530 further includes a selection unit 536.

The training and test unit is further configured to: before training and testing, by using the first dataset, the candidate model selected from the candidate set, train and test each candidate model in the candidate set by using a second dataset, to obtain test accuracy of each candidate model in the candidate set, where a quantity of samples in the second dataset is less than a quantity of samples in the first dataset. The selection unit 536 is configured to select a candidate model from the candidate set based on the test accuracy of each candidate model and a weight of each candidate model.

In another embodiment, the weight of the candidate model is determined based on a total quantity of times of model search performed when the candidate model is added to the candidate set and a total quantity of times of current model search.

In another embodiment, the quantization unit 534 is configured to:

convert a model parameter of the layer structure with the maximum quantization weight in the target model into a model parameter represented by at least one bit quantity, where the at least one bit quantity is a bit quantity that is in a bit quantity set and that is less than a current bit quantity of the model parameter of the layer structure with the maximum quantization weight in the target model, the bit quantity set includes M values, and the M values are used to indicate bit quantities of model parameters of the M single bit models.

In another embodiment, the execution module 530 is further configured to:

when the accuracy of the target model is less than the target threshold, reselect a model from the candidate set, and perform the model search.

In another embodiment, the N evaluation parameters include the inference time, and the parameter obtaining module 520 is configured to:

send the M single bit models to the mobile terminal, so that the mobile terminal runs the M single bit models and measures inference time of each layer structure in the M single bit models; and receive the inference time that is of each layer structure in the M single bit models and that is sent by the mobile terminal.

In another embodiment, during model search performed for the first time, the candidate set includes a single bit model with a largest bit quantity in the M single bit models.

It should be noted that for specific implementations of the foregoing units, refer to the related descriptions in the machine learning model search method shown in FIG. 2 in the foregoing method embodiment. Details are not described herein again.

Figure 6:
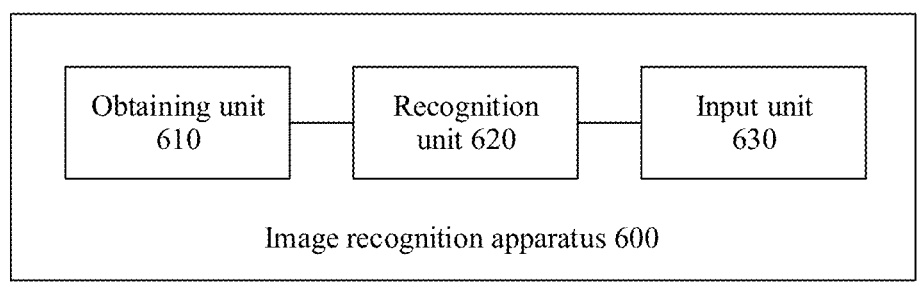
FIG. 6 is a schematic structural diagram of an image recognition apparatus according to an embodiment of this application.

FIG. 6 shows an image recognition apparatus according to an embodiment of this application. The apparatus 600 may be the user equipment 15 in the system shown in FIG. 1. The apparatus 600 may include but is not limited to the following function units:
- an obtaining unit 610, configured to obtain a to-be-recognized image;
- a recognition unit 620, configured to enter the to-be-recognized image into a second image recognition model to obtain a category of the to-be-recognized image; and
- an output unit 630, configured to output the category of the to-be-recognized image.

The second image recognition model is a target model that is output by using a first image classification model as a to-be-quantized model according to the machine learning model search method in FIG. 2. A first image recognition model is a trained deep neural network that can recognize a category of an image, and the first image recognition model is a full-floating-point model or a mixed model.

Optionally, the to-be-recognized image may be an image that is in a current scene and that may be obtained by a terminal through a camera.

It should be noted that for specific implementations of the foregoing units, refer to the related descriptions in the image recognition method shown in FIG. 4 in the foregoing method embodiment. Details are not described herein again.

Figure 7:
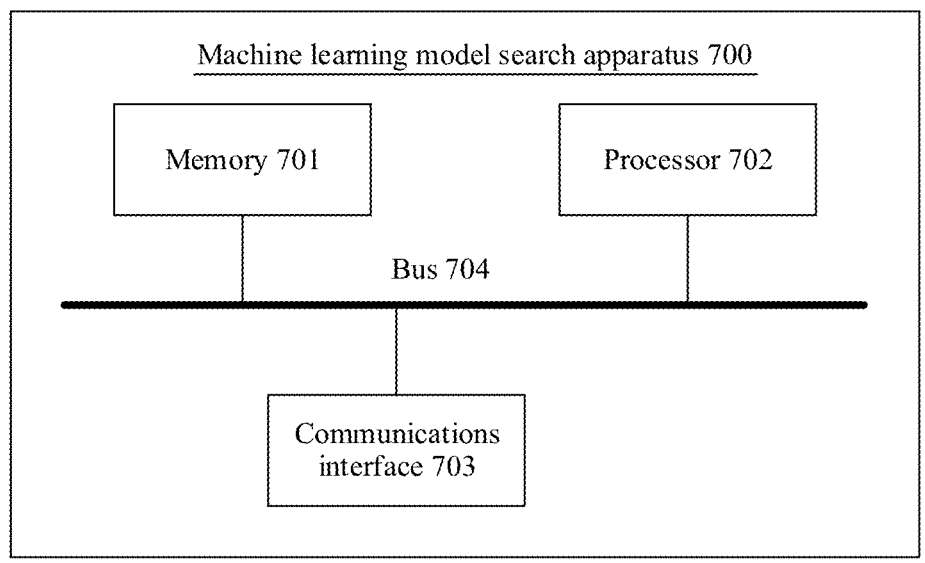
FIG. 7 is a schematic structural diagram of another machine learning model search apparatus according to an embodiment of this application.

FIG. 7 is a schematic diagram of a hardware structure of a machine learning model search apparatus according to an embodiment of this application. The neural network training apparatus 700 (the apparatus 700 may be a computer device) shown in FIG. 7 may include a memory 701, a processor 702, a communications interface 703, and a bus 704. The memory 701, the processor 702, and the communications interface 703 are communicatively connected to each other through the bus 704.

The memory 701 may be a read-only memory (ROM), a static storage device, a dynamic storage device, or a random access memory (RAM). The memory 701 may store a program. When the program stored in the memory 701 is executed by the processor 702, the processor 702 and the communications interface 703 are configured to perform all or some of the operations in the machine learning model search method in the embodiments of this application.

The processor 702 may be a general-purpose central processing unit (CPU), a microprocessor, an application-specific integrated circuit (ASIC), a graphics processing unit (GPU), or one or more integrated circuits, and is configured to: execute a related program, to implement functions that need to be performed by the units in the neural network training apparatus in this embodiment of this application, or perform all or some of the operations in the machine learning model search method in the methods of this application.

The processor 702 may alternatively be an integrated circuit chip and has a signal processing capability. In an implementation process, the operations of the neural network training method in this application may be completed by using a hardware integrated logical circuit in the processor 702 or an instruction in a form of software. The processor 702 may alternatively be a general purpose processor, a digital signal processor (DSP), an application-specific integrated circuit (ASIC), a field programmable gate array (FPGA) or another programmable logic device, a discrete gate or a transistor logic device, or a discrete hardware component. The processor 702 may implement or perform the methods, operations, and logical block diagrams that are disclosed in the embodiments of this application. The general purpose processor may be a microprocessor, or the processor may be any conventional processor, or the like. The operations of the methods disclosed with reference to the embodiments of this application may be directly performed and completed by a hardware decoding processor, or may be performed and completed by a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory 701. The processor 702 reads information in the memory 701, and completes, in combination with hardware of the processor 702, the functions that need to be performed by the units included in the machine learning model search apparatus in this embodiment of this application, or performs all or some of the operations in the machine learning model search method in the method embodiments of this application.

The communications interface 703 is a transceiver apparatus, for example, but not limited to a transceiver, to implement communication between the apparatus 700 and another device or a communications network. For example, a dataset (and a to-be-quantized model) may be obtained through the communications interface 703.

The bus 704 may include a path for transmitting information between the components (the memory 701, the processor 702, and the communications interface 703) in the apparatus 700.

It should be understood that the parameter obtaining module 520 in the machine learning model search apparatus 500 may be equivalent to the communications interface 703 in the neural network search apparatus 700, and the generation module 510 and the execution module 530 may be equivalent to the processor 702.

Figure 8:
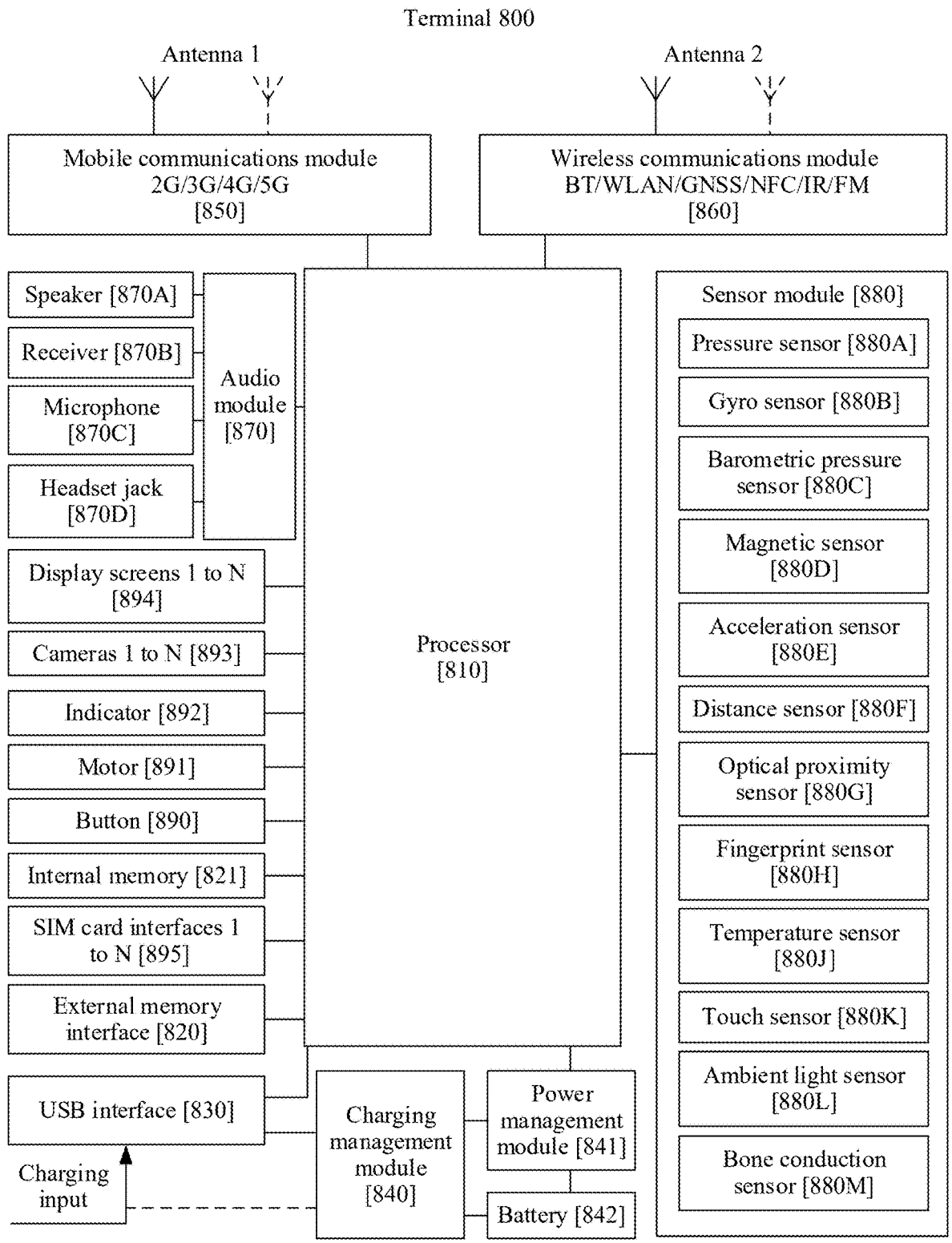
FIG. 8 is a schematic structural diagram of another image recognition apparatus according to an embodiment of this application.

FIG. 8 is a schematic structural diagram of a terminal 800.

The terminal 800 is used as an example below to describe this embodiment in detail. It should be understood that the terminal 800 shown in FIG. 1 is merely an example, and the terminal 800 may have more or fewer components than those shown in FIG. 8, may combine two or more components, or may have different component configurations. Various components shown in the figure may be implemented in hardware, software, or a combination of hardware and software including one or more signal processing and/or application-specific integrated circuits.

The terminal 800 may include a processor 810, an external memory interface 820, an internal memory 821, a universal serial bus (USB) interface 830, a charging management module 840, a power management module 841, a battery 842, an antenna 1, an antenna 2, a mobile communications module 850, a wireless communications module 860, an audio module 870, a speaker 870A, a receiver 870B, a microphone 870C, a headset jack 870D, a sensor module 880, a button 890, a motor 891, an indicator 892, a camera 893, a display screen 894, a subscriber identification module (SIM) card interface 895, and the like. The sensor module 880 may include a pressure sensor 880A, a gyro sensor 880B, a barometric pressure sensor 880C, a magnetic sensor 880D, an acceleration sensor 880E, a distance sensor 880F, an optical proximity sensor 880G, a fingerprint sensor 880H, a temperature sensor 880J, a touch sensor 880K, an ambient light sensor 880L, a bone conduction sensor 880M, and the like.

It may be understood that the structure shown in this embodiment of the present invention does not constitute a specific limitation on the terminal 800. In some other embodiments of this application, the terminal 800 may include more or fewer components than those shown in the figure, combine some components, split some components, or have different component arrangements. The components shown in the figure may be implemented by hardware, software, or a combination of software and hardware.

The processor 810 may include one or more processing units. For example, the processor 810 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices, or may be integrated into one or more processors.

The controller may be a nerve center and a command center of the terminal 800. The controller may generate an operation control signal based on instruction operation code and a time sequence signal, to complete control of instruction fetching and instruction execution.

The memory may be further disposed in the processor 810, and is configured to store an instruction and data. In some embodiments, the memory in the processor 810 is a cache memory. The memory may store an instruction or data that is just used or cyclically used by the processor 810. If the processor 810 needs to use the instruction or the data again, the processor 810 may directly invoke the instruction or the data from the memory. This avoids repeated access and reduces a waiting time of the processor 810, thereby improving system efficiency.

In some embodiments, the processor 810 may include one or more interfaces. The interface may include an inter-integrated circuit (I2C) interface, an inter-integrated circuit sound (I2S) interface, a pulse code modulation (PCM) interface, a universal asynchronous receiver/transmitter (universal asynchronous receiver/transmitter, UART) interface, a mobile industry processor interface (MIPI), a general-purpose input/output (GPIO) interface, a subscriber identification module (SIM) interface, a universal serial bus (USB) interface, and/or the like.

The I2C interface is a two-way synchronization serial bus, and includes a serial data line (SDA) and a serial clock line (SCL). In some embodiments, the processor 810 may include a plurality of groups of I2C buses. The processor 810 may be separately coupled to the touch sensor 880K, a charger, a flash, the camera 893, and the like through different I2C bus interfaces. For example, the processor 810 may be coupled to the touch sensor 880K through the I2C interface, so that the processor 810 communicates with the touch sensor 880K through the I2C bus interface, to implement a touch function of the terminal 800.

The I2S interface may be used for audio communication. In some embodiments, the processor 810 may include a plurality of groups of I2S buses. The processor 810 may be coupled to the audio module 870 through the I2S bus, to implement communication between the processor 810 and the audio module 870. In some embodiments, the audio module 870 may transmit an audio signal to the wireless communications module 860 through the I2S interface, to implement a function of answering a call by using a Bluetooth headset.

The PCM interface may also be used for audio communication, to sample, quantize, and code an analog signal. In some embodiments, the audio module 870 may be coupled to the wireless communications module 860 through a PCM bus interface. In some embodiments, the audio module 870 may alternatively transmit an audio signal to the wireless communications module 860 through the PCM interface, to implement a function of answering a call by using a Bluetooth headset. Both the I2S interface and the PCM interface may be used for audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 810 to the wireless communications module 860. For example, the processor 810 communicates with a Bluetooth module in the wireless communications module 860 through the UART interface, to implement a Bluetooth function. In some embodiments, the audio module 870 may transmit an audio signal to the wireless communications module 860 through the UART interface, to implement a function of playing music by using a Bluetooth headset.

The MIPI interface may be configured to connect the processor 810 to peripheral devices such as the display screen 894 and the camera 893. The MIPI interface includes a camera serial interface (CSI), a display serial interface (DSI), and the like. In some embodiments, the processor 810 communicates with the camera 893 through the CSI interface, to implement a photographing function of the terminal 800. The processor 810 communicates with the display screen 894 through the DSI interface, to implement a display function of the terminal 800.

The GPIO interface may be configured by using software. The GPIO interface may be configured as a control signal or a data signal. In some embodiments, the GPIO interface may be configured to connect the processor 810 to the camera 893, the display screen 894, the wireless communications module 860, the audio module 870, the sensor module 880, and the like. The GPIO interface may alternatively be configured as the I2C interface, the I2S interface, the UART interface, the MIPI interface, or the like.

The USB interface 830 is an interface that conforms to a USB standard specification, and may be a mini USB interface, a micro USB interface, a USB Type-C interface, or the like. The USB interface 830 may be configured to connect to the charger to charge the terminal 800, may be configured to transmit data between the terminal 800 and a peripheral device, or may be configured to connect to a headset to play audio by using the headset. Alternatively, the interface may be configured to connect to another electronic device, for example, an AR device.

It may be understood that an interface connection relationship between the modules shown in this embodiment of the present invention is merely an example for description, and does not constitute a limitation on the structure of the terminal 800. In some other embodiments of this application, the terminal 800 may alternatively use an interface connection manner different from that in the foregoing embodiment, or a combination of a plurality of interface connection manners.

The charging management module 840 is configured to receive charging input from the charger. The charger may be a wireless charger or a wired charger. In some embodiments of wired charging, the charging management module 840 may receive charging input from the wired charger through the USB interface 830. In some embodiments of wireless charging, the charging management module 840 may receive wireless charging input by using a wireless charging coil of the terminal 800. The charging management module 840 supplies power to the electronic device by using the power management module 841 while charging the battery 842.

The power management module 841 is configured to connect the battery 842 and the charging management module 840 to the processor 810. The power management module 841 receives input from the battery 842 and/or the charging management module 840, and supplies power to the processor 810, the internal memory 821, an external memory, the display screen 894, the camera 893, the wireless communications module 860, and the like. The power management module 841 may be further configured to monitor parameters such as a battery capacity, a battery cycle count, and a battery health status (electric leakage or impedance). In some other embodiments, the power management module 841 may alternatively be disposed in the processor 810. In some other embodiments, the power management module 841 and the charging management module 840 may alternatively be disposed in a same device.

A wireless communication function of the terminal 800 may be implemented through the antenna 1, the antenna 2, the mobile communications module 850, the wireless communications module 860, the modem processor, the baseband processor, and the like.

The antenna 1 and the antenna 2 are configured to: transmit and receive electromagnetic wave signals. Each antenna in the terminal 800 may be configured to cover one or more communications frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communications module 850 may provide a wireless communication solution that includes 2G/3G/4G/5G or the like and that is applied to the terminal 800. The mobile communications module 850 may include at least one filter, a switch, a power amplifier, a low noise amplifier (LNA), and the like. The mobile communications module 850 may receive an electromagnetic wave through the antenna 1, perform processing such as filtering or amplification on the received electromagnetic wave, and transmit a processed electromagnetic wave to the modem processor for demodulation. The mobile communications module 850 may further amplify a signal modulated by the modem processor, and convert the signal into an electromagnetic wave for radiation through the antenna 1. In some embodiments, at least some function modules of the mobile communications module 850 may be disposed in the processor 810. In some embodiments, at least some function modules of the mobile communications module 850 and at least some modules of the processor 810 may be disposed in a same device.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal through an audio device (which is not limited to the speaker 870A, the receiver 870B, or the like), or displays an image or a video through the display screen 894. In some embodiments, the modem processor may be an independent component. In some other embodiments, the modem processor may be independent of the processor 810, and is disposed in a same component as the mobile communications module 850 or another function module.

The wireless communications module 860 may provide a wireless communication solution that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like and that is applied to the terminal 800. The wireless communications module 860 may be one or more components integrating at least one communications processor module. The wireless communications module 860 receives an electromagnetic wave through the antenna 2, performs frequency modulation and filtering processing on an electromagnetic wave signal, and sends a processed signal to the processor 810. The wireless communications module 860 may further receive a to-be-sent signal from the processor 810, perform frequency modulation and amplification on the signal, and convert the signal into an electromagnetic wave for radiation through the antenna 2.

In some embodiments, the antenna 1 and the mobile communications module 850 of the terminal 800 are coupled, and the antenna 2 and the wireless communications module 860 of the terminal 800 are coupled, so that the terminal 800 can communicate with a network and another device by using a wireless communications technology. The wireless communications technology may include a global system for mobile communications (GSM), a general packet radio service (GPRS), code division multiple access (CDMA), wideband code division multiple access (WCDMA), time division-synchronous code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or satellite based augmentation systems (SBAS).

The terminal 800 implements a display function by using the GPU, the display screen 894, the application processor, and the like. The GPU is a microprocessor for image processing, and is connected to the display screen 894 and the application processor. The GPU is configured to: perform mathematical and geometric calculation, and render an image. The processor 810 may include one or more GPUs that execute program instructions to generate or change display information.

The display screen 894 is configured to display an image, a video, and the like. The display screen 894 includes a display panel. The display panel may be a liquid crystal display (LCD), an organic light-emitting diode (OLED), an active-matrix organic light emitting diode (AMOLED), a flexible light-emitting diode (FLED), a mini LED, a micro LED, a micro OLED, quantum dot light emitting diodes (QLED), or the like. In some embodiments, the terminal 800 may include one or N display screens 894, where N is a positive integer greater than 1.

The terminal 800 can implement the photographing function by using the ISP, the camera 893, the video codec, the GPU, the display screen 894, the application processor, and the like.

The ISP is configured to process data fed back by the camera 893. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 893.

The camera 893 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the terminal 800 may include one or N cameras 893, where N is a positive integer greater than 1.

The digital signal processor is configured to process a digital signal. In addition to a digital image signal, the digital signal processor may further process another digital signal. For example, when the terminal 800 selects a frequency, the digital signal processor is configured to perform Fourier transform on frequency energy and the like.

The video codec is configured to: compress or decompress a digital video. The terminal 800 may support one or more video codecs. In this way, the terminal 800 can play or record videos in a plurality of coding formats, for example, moving picture experts group (MPEG)-1, MPEG-2, MPEG-3, and MPEG-4.

The NPU is a neural-network (NN) computing processor. The NPU quickly processes input information by referring to a biological neural network structure, for example, by referring to a mode of transfer between human brain neurons, and may further continuously perform self-learning. Applications such as intelligent cognition of the terminal 800 may be implemented by using the NPU, for example, image recognition, facial recognition, voice recognition, and text understanding.

The external memory interface 820 may be configured to connect to an external storage card, for example, a micro SD card, to extend a storage capability of the terminal 800. The external storage card communicates with the processor 810 through the external memory interface 820, to implement a data storage function. For example, files such as music and a video are stored in the external storage card.

The internal memory 821 may be configured to store computer executable program code. The executable program code includes an instruction. The processor 810 performs various function applications of the terminal 800 and data processing by running the instruction stored in the internal memory 821. The internal memory 821 may include a program storage area and a data storage area. The program storage area may store an operating system, an application required by at least one function (for example, a sound playing function or an image playing function), and the like. The data storage area may store data (for example, audio data or a phone book) created in a use process of the terminal 800, and the like. In addition, the internal memory 821 may include a high-speed random access memory, or may include a non-volatile memory, for example, at least one magnetic disk storage device, a flash storage device, a universal flash storage (UFS), or the like.

The terminal 800 can implement an audio function such as music playing or recording by using the audio module 870, the speaker 870A, the receiver 870B, the microphone 870C, the headset jack 870D, the application processor, and the like.

The audio module 870 is configured to convert digital audio information into an analog audio signal output, and is also configured to convert an analog audio input into a digital audio signal. The audio module 870 may be further configured to: code and decode an audio signal. In some embodiments, the audio module 870 may be disposed in the processor 810, or some function modules in the audio module 870 are disposed in the processor 810.

The speaker 870A, also referred to as a "horn", is configured to convert an audio electrical signal into a sound signal. The terminal 800 may be used to listen to music or answer a call in a hands-free mode over the speaker 870A.

The receiver 870B, also referred to as an "earpiece", is configured to convert an audio electrical signal into a sound signal. When a call is answered or voice information is received by using the terminal 800, the receiver 870B may be put close to a human ear to listen to a voice.

The microphone 870C, also referred to as a "mike" or a "microphone", is configured to convert a sound signal into an electrical signal. When making a call or sending voice information, a user may make a sound by moving a human mouth close to the microphone 870C to input a sound signal to the microphone 870C. At least one microphone 870C may be disposed in the terminal 800. In some other embodiments, two microphones 870C may be disposed in the terminal 800, to collect a sound signal and further implement a noise reduction function. In some other embodiments, three, four, or more microphones 870C may alternatively be disposed in the terminal 800, to collect a sound signal, reduce noise, further identify a sound source, implement a directional recording function, and the like.

The headset jack 870D is configured to connect to a wired headset. The headset jack 870D may be the USB interface 830, or may be a 3.5 mm open mobile terminal platform (OMTP) standard interface or a cellular telecommunications industry association of the USA (CTIA) standard interface.

The pressure sensor 880A is configured to sense a pressure signal, and can convert the pressure signal into an electrical signal. In some embodiments, the pressure sensor 880A may be disposed on the display screen 894. There are many types of pressure sensors 880A such as a resistive pressure sensor, an inductive pressure sensor, and a capacitive pressure sensor. The capacitive pressure sensor may include at least two parallel plates made of conductive materials. When a force is applied to the pressure sensor 880A, capacitance between electrodes changes. The terminal 800 determines pressure intensity based on the change of the capacitance. When a touch operation is performed on the display screen 894, the terminal 800 detects intensity of the touch operation based on the pressure sensor 880A. The terminal 800 may also calculate a touch location based on a detection signal of the pressure sensor 880A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on a Messages icon, an instruction for creating a new SMS message is executed.

The gyro sensor 880B may be configured to determine a movement posture of the terminal 800. In some embodiments, angular velocities of the terminal 800 around three axes (namely, x, y, and z axes) may be determined by using the gyro sensor 880B. The gyro sensor 880B may be configured to perform image stabilization during photographing. For example, when a shutter is pressed, the gyro sensor 880B detects an angle at which the terminal 800 jitters, obtains, through calculation based on the angle, a distance for which a lens module needs to compensate, and allows a lens to cancel the jitter of the terminal 800 through reverse motion, to implement image stabilization. The gyro sensor 880B may be further used in navigation and motion sensing game scenarios.

The barometric pressure sensor 880C is configured to measure barometric pressure. In some embodiments, the terminal 800 calculates an altitude by using a value of the barometric pressure measured by the barometric pressure sensor 880C, to assist in positioning and navigation.

The magnetic sensor 880D includes a Hall sensor. The terminal 800 may detect opening and closing of a flip leather case by using the magnetic sensor 880D. In some embodiments, when the terminal 800 is a clamshell phone, the terminal 800 may detect opening and closing of a flip cover based on the magnetic sensor 880D. Further, a feature such as automatic unlocking upon opening of the flip cover is set based on a detected opening or closing state of the leather case or a detected opening or closing state of the flip cover.

The acceleration sensor 880E may detect values of accelerations in various directions (usually three axes) of the terminal 800, and may detect magnitude and a direction of the gravity when the terminal 800 is still. The acceleration sensor 880E may be further configured to identify a posture of the electronic device, and is applied to an application such as switching between landscape mode and portrait mode or a pedometer.

The distance sensor 880F is configured to measure a distance. The terminal 800 may measure the distance in an infrared or a laser manner. In some embodiments, in a photographing scenario, the terminal 800 may measure a distance by using the distance sensor 880F to implement quick focusing.

For example, the optical proximity sensor 880G may include a light-emitting diode (LED) and an optical detector, for example, a photodiode. The light-emitting diode may be an infrared light-emitting diode. The terminal 800 emits infrared light by using the light-emitting diode. The terminal 800 detects infrared reflected light from a nearby object by using the photodiode. When sufficient reflected light is detected, the terminal 800 may determine that there is an object near the terminal 800. When insufficient reflected light is detected, the terminal 800 may determine that there is no object near the terminal 800. The terminal 800 may detect, by using the optical proximity sensor 880G, that the user holds the terminal 800 close to an ear to make a call, so as to automatically turn off a screen for power saving. The optical proximity sensor 880G may also be used in a leather case mode or a pocket mode to automatically unlock or lock the screen.

The ambient light sensor 880L is configured to sense ambient light brightness. The terminal 800 may adaptively adjust brightness of the display screen 894 based on the sensed ambient light brightness. The ambient light sensor 880L may also be configured to automatically adjust white balance during photographing. The ambient light sensor 880L may also cooperate with the optical proximity sensor 880G to detect whether the terminal 800 is in a pocket to prevent an accidental touch.

The fingerprint sensor 880H is configured to collect a fingerprint. The terminal 800 may use a feature of the collected fingerprint to implement fingerprint-based unlocking, application lock access, fingerprint-based photographing, fingerprint-based call answering, and the like.

The temperature sensor 880J is configured to detect temperature. In some embodiments, the terminal 800 executes a temperature processing policy by using the temperature detected by the temperature sensor 880J. For example, when the temperature reported by the temperature sensor 880J exceeds a threshold, the terminal 800 lowers performance of a processor near the temperature sensor 880J, to reduce power consumption for thermal protection. In some other embodiments, when the temperature is less than another threshold, the terminal 800 heats the battery 842 to prevent the terminal 800 from being shut down abnormally because of a low temperature. In some other embodiments, when the temperature is less than still another threshold, the terminal 800 boosts an output voltage of the battery 842 to avoid abnormal shutdown caused by a low temperature.

The touch sensor 880K is also referred to as a "touch panel". The touch sensor 880K may be disposed on the display screen 894, and the touch sensor 880K and the display screen 894 form a touchscreen, which is also referred to as a "touchscreen". The touch sensor 880K is configured to detect a touch operation performed on or near the touch sensor 880K. The touch sensor may transfer the detected touch operation to the application processor, to determine a type of a touch event. Visual output related to the touch operation may be provided through the display screen 894. In some other embodiments, the touch sensor 880K may alternatively be disposed on a surface of the terminal 800 at a location different from that of the display screen 894.

The bone conduction sensor 880M may obtain a vibration signal. In some embodiments, the bone conduction sensor 880M may obtain a vibration signal of a vibration bone of a human vocal part. The bone conduction sensor 880M may also be in contact with a human pulse, and receive a blood pressure beating signal. In some embodiments, the bone conduction sensor 880M may alternatively be disposed in a headset to form a bone conduction headset. The audio module 870 may obtain a voice signal through parsing based on the vibration signal that is of the vibration bone of the vocal part and that is obtained by the bone conduction sensor 880M, to implement a voice function. The application processor may parse heart rate information based on the blood pressure beating signal obtained by the bone conduction sensor 880M, to implement a heart rate detection function.

The button 890 includes a power button, a volume button, and the like. The button 890 may be a mechanical button, or may be a touch button. The terminal 800 may receive button input, and generate button signal input related to a user setting and function control of the terminal 800.

The motor 891 may generate a vibration prompt. The motor 891 may be used for an incoming call vibration prompt, or may be used for a touch vibration feedback. For example, touch operations performed on different applications (for example, photographing and audio playing) may correspond to different vibration feedback effects. The motor 891 may also correspond to different vibration feedback effects for touch operations performed on different areas of the display screen 894. Different application scenarios (for example, a time reminder, information receiving, an alarm clock, and a game) may also correspond to different vibration feedback effects. A touch vibration feedback effect may be further customized.

The indicator 892 may be an indicator light, and may be configured to indicate a charging status and a power change, or may be configured to indicate a message, a missed call, a notification, and the like.

The SIM card interface 895 is configured to connect to a SIM card. The SIM card may be inserted into the SIM card interface 895 or plugged from the SIM card interface 895, to implement contact with or separation from the terminal 800. The terminal 800 may support one or N SIM card interfaces, where N is a positive integer greater than 1. The SIM card interface 895 may support a nano SIM card, a micro SIM card, a SIM card, and the like. A plurality of cards may be inserted into a same SIM card interface 895 at the same time. The plurality of cards may be of a same type or of different types. The SIM card interface 895 may also be compatible with different types of SIM cards. The SIM card interface 895 may also be compatible with the external storage card. The terminal 800 interacts with a network by using the SIM card, to implement a call function, a data communication function, and the like. In some embodiments, the terminal 800 uses an eSIM, namely, an embedded SIM card. The eSIM card may be embedded into the terminal 800, and cannot be separated from the terminal 800.

In this embodiment of this application, the processor 14021 reads information in the memory 1401, and completes, in combination with hardware of the processor 14021, the functions that need to be performed by the units included in the image recognition apparatus 600 in this embodiment of this application, or performs the image recognition method in the method embodiments of this application.

In this embodiment of this application, the terminal 800 may photograph an image in a current scene through the camera 893, to obtain a to-be-recognized image. The terminal 800 may output the to-be-recognized image and/or a category of the to-be-recognized image through a display.

For specific implementations of the function units in FIG. 8, refer to the related descriptions in the embodiment of the image recognition method shown in FIG. 4. Details are not described again in this embodiment of this application.

A person skilled in the art can understand that the functions described with reference to various illustrative logical blocks, modules, and algorithm operations disclosed in this specification can be implemented by hardware, software, firmware, or any combination thereof. If the embodiments are implemented by software, the functions described with reference to the illustrative logical blocks, modules, and operations may be stored in or transmitted over a computer readable medium as one or more instructions or code and executed by a hardware-based processing unit. The computer readable medium may include a computer readable storage medium, which corresponds to a tangible medium such as a data storage medium, or may include any communications medium that facilitates transmission of a computer program from one place to another (for example, according to a communications protocol). In this manner, the computer readable medium may usually correspond to: (1) a non-transitory tangible computer readable storage medium, or (2) a communications medium such as a signal or a carrier. The data storage medium may be any usable medium that can be accessed by one or more computers or one or more processors to retrieve instructions, code, and/or data structures for implementing the technologies described in this application. A computer program product may include a computer readable medium.

In an example but not a limitation, such computer readable storage media may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of an instruction or a data structure and that can be accessed by a computer. In addition, any connection is properly referred to as a computer readable medium. For example, if an instruction is transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically by using lasers. Combinations of the foregoing items should also be included in the scope of the computer readable media.

An instruction may be executed by one or more processors such as one or more digital signal processors (DSP), general-purpose microprocessors, application-specific integrated circuits (ASIC), field programmable gate arrays (FPGA), or other equivalent integrated or discrete logic circuits. Therefore, the term "processor" used in this specification may be any one of the foregoing structures or any other structure suitable for implementing the technologies described in this specification. In addition, in some aspects, the functions described with reference to the illustrative logical blocks, modules, and operations described in this specification may be provided within dedicated hardware and/or software modules configured for coding and decoding, or may be incorporated into a combined codec. In addition, the technologies may all be implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize function aspects of the apparatuses configured to perform the disclosed technologies, but are not necessarily implemented by different hardware units. Actually, as described above, various units may be combined into a codec hardware unit in combination with appropriate software and/or firmware, or may be provided by interoperable hardware units (including the one or more processors described above).

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A machine learning model search method, comprising:
generating M single bit models based on a to-be-quantized model, wherein each of the M single bit models and the to-be-quantized model is a deep neural network with a same network structure, and M is a positive integer greater than 1;
obtaining N evaluation parameters of all layer structures in the M single bit models through a measurement when a mobile terminal runs the M single bit models; and
performing a model search process for at least one time, to output a target model whose N evaluation parameters and accuracy meet their respective requirements;
wherein the model search process comprises:
training and testing, by using a first dataset, a candidate model selected from a candidate set, to obtain the target model and accuracy of the target model, wherein the candidate model is a mixed bit model having the same network structure as the to-be-quantized model, and wherein the first dataset comprises a plurality of samples; and
when at least one of the N evaluation parameters of the target model does not meet a predetermined threshold and the accuracy of the target model is greater than a target threshold, obtaining N evaluation parameters of all layer structures in the target model based on the N evaluation parameters of all the layer structures in the M single bit models, determining a quantization weight of each layer structure in the target model based on the network structure of the target model and the N evaluation parameters of all the layer structures in the target model, quantizing a layer structure with a maximum quantization weight in the target model, and adding a model obtained through quantization to the candidate set.

2. The method according to claim 1, wherein the N evaluation parameters of the target model comprise an inference time and a parameter quantity, and the determining the quantization weight of each layer structure in the target model based on the network structure of the target model and the N evaluation parameters of all the layer structures in the target model comprises:
when the inference time of the target model is greater than a target inference time and the parameter quantity of the target model is not greater than a target parameter quantity, determining a quantization weight of a layer structure i in the target model based on an inference time of the layer structure i in the target model and a weight of the layer structure i in the target model, wherein i is an index of a layer structure in the target model, and i is a positive integer;
when the inference time of the target model is not greater than the target inference time and the parameter quantity of the target model is greater than the target parameter quantity, determining the quantization weight of the layer structure i in the target model based on the parameter quantity of the layer structure i in the target model and the weight of the layer structure i in the target model; or
when the inference time of the target model is greater than the target inference time and the parameter quantity of the target model is greater than the target parameter quantity, determining the quantization weight of the layer structure i in the target model based on the inference time of the layer structure i in the target model, the parameter quantity of the layer structure i in the target model, and the weight of the layer structure i in the target model.

3. The method according to claim 1, wherein before the training and testing the candidate model selected from the candidate set, the model search process further comprises:
training and testing each candidate model in the candidate set by using a second dataset, to obtain a test accuracy of each candidate model in the candidate set, wherein a quantity of samples in the second dataset is less than a quantity of samples in the first dataset; and
selecting the candidate model from the candidate set based on the test accuracy of each candidate model and a weight of each candidate model.

4. The method according to claim 3, wherein the weight of the candidate model is determined based on a total quantity of times of model search performed when the candidate model is added to the candidate set and a total quantity of times of current model search.

5. The method according to claim 1, wherein the quantizing the layer structure with the maximum quantization weight in the target model comprises:
converting a model parameter of the layer structure with the maximum quantization weight in the target model into a model parameter represented by at least one bit quantity, wherein the at least one bit quantity is a bit quantity that is in a bit quantity set and that is less than a current bit quantity of the model parameter of the layer structure with the maximum quantization weight in the target model, wherein the bit quantity set comprises M values, and wherein the M values indicate bit quantities of model parameters of the M single bit models.

6. The method according to claim 1, wherein the model search process further comprises:
when the accuracy of the target model is less than the target threshold, reselecting a different model from the candidate set, and performing the model search process.

7. The method according to claim 1, wherein the N evaluation parameters of all layer structures in the M single bit models comprise an inference time, and the obtaining the N evaluation parameters of all layer structures in the M single bit models comprises:
sending the M single bit models to the mobile terminal, which runs the M single bit models and measures an inference time of each layer structure in the M single bit models; and
receiving the inference time of each layer structure in the M single bit models from the mobile terminal.

8. The method according to claim 1, wherein during a model search performed for the first time, the candidate set comprises a single bit model with a largest bit quantity in the M single bit models.

9. A terminal device, comprising:
at least one processor; and
at least one memory, the at least one memory comprising instructions that when executed by the at least one processor, cause the terminal device to:
generate M single bit models based on a to-be-quantized model, wherein each of the M single bit models and the to-be-quantized model is a deep neural network with a same network structure, and M is a positive integer greater than 1;

obtain N evaluation parameters of all layer structures in the M single bit models through a measurement when a mobile terminal runs the M single bit models; and perform a model search process for at least one time, to output a target model whose N evaluation parameters and accuracy meet their respective requirements, wherein the model search process comprises:

training and testing, by using a first dataset, a candidate model selected from a candidate set, to obtain the target model and accuracy of the target model, wherein the candidate model is a mixed bit model having the same network structure as the to-be-quantized model, and wherein the first dataset comprises a plurality of samples; and when at least one of the N evaluation parameters of the target model does not meet a predetermined threshold and the accuracy of the target model is greater than a target threshold, obtaining N evaluation parameters of all layer structures in the target model based on the N evaluation parameters of all the layer structures in the M single bit models, determining a quantization weight of each layer structure in the target model based on the network structure of the target model and the N evaluation parameters of all the layer structures in the target model, quantizing a layer structure with a maximum quantization weight in the target model, and adding a model obtained through quantization to the candidate set.

10. The terminal device according to claim 9, wherein the N evaluation parameters of the target model comprise an inference time and a parameter quantity, and the determining the quantization weight of each layer structure in the target model based on a network structure of the target model and the N evaluation parameters of all the layer structures in the target model comprises:

when the inference time of the target model is greater than a target inference time and the parameter quantity of the target model is not greater than a target parameter quantity, determining a quantization weight of a layer structure i in the target model based on an inference time of the layer structure i in the target model and a weight of the layer structure i in the target model, wherein i is an index of a layer structure in the target model, and i is a positive integer;

when the inference time of the target model is not greater than the target inference time and the parameter quantity of the target model is greater than the target parameter quantity, determining the quantization weight of the layer structure i in the target model based on the parameter quantity of the layer structure i in the target model and the weight of the layer structure i in the target model; or when the inference time of the target model is greater than the target inference time and the parameter quantity of the target model is greater than the target parameter quantity, determining the quantization weight of the layer structure i in the target model based on the inference time of the layer structure i in the target model, the parameter quantity of the layer structure i in the target model, and the weight of the layer structure i in the target model.

11. The terminal device according to claim 9, wherein before the training and testing the candidate model selected from the candidate set, the mode search process further comprises:

training and testing each candidate model in the candidate set by using a second dataset, to obtain test accuracy of each candidate model in the candidate set, wherein a quantity of samples in the second dataset is less than a quantity of samples in the first dataset; and selecting the candidate model from the candidate set based on the test accuracy of each candidate model and a weight of each candidate model.

12. The terminal device according to claim 11, wherein the weight of the candidate model is determined based on a total quantity of times of model search performed when the candidate model is added to the candidate set and a total quantity of times of current model search.

13. The terminal device according to claim 9, wherein the quantizing the layer structure with the maximum quantization weight in the target model comprises:

converting a model parameter of the layer structure with the maximum quantization weight in the target model into a model parameter represented by at least one bit quantity, wherein the at least one bit quantity is a bit quantity that is in a bit quantity set and that is less than a current bit quantity of the model parameter of the layer structure with the maximum quantization weight in the target model, wherein the bit quantity set comprises M values, and wherein the M values indicate bit quantities of model parameters of the M single bit models.

14. The terminal device according to claim 9, wherein the model search process further comprises:

when the accuracy of the target model is less than the target threshold, reselecting a different model from the candidate set, and performing the model search process.

15. The terminal device according to claim 9, wherein the N evaluation parameters of all layer structures in the M single bit models comprise an inference time, and the obtaining the N evaluation parameters of all layer structures in the M single bit models comprises:

sending the M single bit models to the mobile terminal which runs the M single bit models and measures inference time of each layer structure in the M single bit models; and receiving the inference time of each layer structure in the M single bit models from the mobile terminal.

16. The terminal device according to claim 9, wherein during a model search performed for the first time, the candidate set comprises a single bit model with a largest bit quantity in the M single bit models.

* * * * *